May 5, 1959 A. LESTI 2,885,594

COLOR TELEVISION IMAGE REGISTRATION SYSTEM

Filed July 5, 1957 4 Sheets-Sheet 1

INVENTOR
Arnold Lesti

COLOR TELEVISION IMAGE REGISTRATION SYSTEM

Filed July 5, 1957 4 Sheets-Sheet 2

INVENTOR
Arnold Lesti

INVENTOR
Arnold Lesti

COLOR TELEVISION IMAGE REGISTRATION SYSTEM

Filed July 5, 1957 4 Sheets-Sheet 4

INVENTOR
Arnold Lesti

United States Patent Office 2,885,594

Patented May 5, 1959

2,885,594

COLOR TELEVISION IMAGE REGISTRATION SYSTEM

Arnold Lesti, Kensington, Md., assignor to Andromeda, Inc., Kensington, Md.

Application July 5, 1957, Serial No. 670,135

36 Claims. (Cl. 315—10)

This invention relates to improvements in color television systems wherein color picture tubes are used in conjunction with multiple element target screens. Such multiple elements may take the form of substantially horizontal component color light producing strips. The screen is appropriately scanned by electron beam means to produce color light images. In this arrangement a series of horizontally disposed phosphor strips each have a sub-element width such that a group of three adjacent strips giving different component colors have a combined width which is preferably not greater than the width of the elementary image area of the television system.

The present invention is further concerned with the use of three cathode ray beams to scan the horizontal color phosphor strips. Each beam is independently modulated by the color signal to which it corresponds. In particular, this invention further deals in improved means for obtaining correct registration between the scanning beams and the phosphor screen, such that, for example, the red signal modulated beam will strike the red light emitting phosphor strips, the blue signal modulated beam will strike the blue light emitting phosphor strips, and the green signal modulated beam will strike the green light emitting phosphor strips, with a minimum of error, under all operating conditions, and with simple reliable circuitry.

This invention may be considered an improvement on the disclosures in my patents on color television receiver No. 2,657,257, and No. 2,706,216, and other related patents.

An object of the present invention is to operate a triple beam registration system to make possible the use of a simple, inexpensive picture tube which will not require critically aligned components.

In one form of the invention the phosphor screen has horizontal red, green, and blue phosphor emitting strips. The blue phosphor consists of a mixture of slow light decay phosphor which emits light of a blue color and a fast light decay phosphor which emits light of a violet color. The combination of the two phosphors produces the correct blue color, while the fast phosphor renders it possible to sense the actually emitted light by a photo sensitive device, when a pilot signal derived from a single high frequency carrier is utilized to modulate two of the beams. The output of the photo sensitive device is utilized in a feedback path to cause minor changes in the vertical deflection of the triple beam in order to correct the registration.

In some forms of the prior art using three beams, two and three oscillators have been suggested, each modulating a different beam, and the demodulation, after sensing, in such cases, is either amplitude or frequency demodulation. It can be understood that in the above prior art such multiplicity of oscillators are expensive and unduly complicated.

In the present invention an object is to use a single pilot frequency oscillator applied as superimposed modulation on two of the three beams at different phases, substantially 180° apart. Accordingly, in a triple beam tube for example, a single frequency at different phases may be used to derive up-and-down vertical correction signals, for a horizontal strips phosphor screen, by sensing the phase of the pilot frequency energy from the screen.

In another form of the invention one of the plurality of sets of phosphor strips, instead of being composed of the mixture above referred to, is regular phosphor but backed by material producing secondary emission to a different degree than the surrounding material. As the appropriate beams traverse this region signals may be sensed. While the secondary emission sensing technique, by itself, is well known to the prior art, the present invention uses this in a novel and useful combination. It is another object of the present invention to use secondary emission or any other energy emission means produced by material laid essentially in or over the horizontally disposed phosphor strips corresponding to one of the three component colors, in conjunction with three beams, and a phase sensed single pilot carrier frequency applied to two of the beams. This combination leads to overall simplicity and reliability as detailed hereinbelow.

This invention is also concerned with all of the other factors involved in the overall color registration system. The techniques mentioned above must be used with others equally important. It is well known that in a three beam tube a large angle between the axes of the beams leads to registration difficulties. The present invention preferably calls for the use of beam axes that have a small angular separation between them. The convergence angle of the three beams must be small, and the actual separation of the axes must be small. Errors introduced by the beam deflection system produce much smaller actual separation errors of the beam spots on the screen when the separation and angle between the beams are small, than when they are large.

Another object of the present invention is to produce a color registration system which utilizes the above mentioned features in conjunction with beams such as triple beams whose axes are close enough together and with small angular separation, such that the tube may be treated approximately as of the single gun type. In this connection, a further detailed object of this invention is to specify a construction in the gun with a single cathode, and three beam control electrodes consisting of three insulated thin coplanar members, connected as signal control electrodes, with small separation between them and the cathode surface. Each of the three coplanar members has a small hole through which the electron beam passes. Small diameters of the crossovers of the electron beams will be produced, which is necessary for small projected beam spot diameters on the screen. Another electrode, close to the control electrodes, with a flat face parallel to them, will be provided with three holes aligned with the holes in the control electrodes. This latter electrode will shield the other electrodes and prevent crosstalk. It will further act as a convergence control electrode besides being a beam shield.

The use of sensed energy emitted from the picture screen in a feedback loop to control the deflection of the beams to obtain correct registration is known to the prior art in its broad form. Actual scanning rasters and phosphor strip geometry, however, present a complex situation which requires new considerations in the feed back circuitry which form another important object of the present invention. When the scanning lines move from left to right, the uncorrected raster will cause a beam spot to cross lines many times in various positions of the screen. Since ordinary feedback theory will tend to correct the nearest position of the beam to its appropriate phosphor strip, in one horizontal scan there may be many positions to which the beam could move for correct color, but these positions would not be necessarily on a smooth horizontal line. The sensed correcting signals could not always compensate for the deflection errors equivalent to a multiplicity of triple lines. Also, momentary loss of control due to noise, cross modulation, or other causes might suddenly cause the line to jump to another vertical position.

It is another object of the present invention to provide an integrating circuit in the feedback loop which is always active to greatly reduce errors and prevent the above mentioned discontinuities. In this connection a further object is to give the detailed requirements on the integrator to meet the various conditions and the formulas governing them.

The discontinuities which might be present in the scanning operation are of two types. One type governs the start of each horizontal line on the extreme left side of the picture, while the other may occur in any position after the start. The last mentioned type is the one already referred to.

It is a further object of the present invention to preferably correct for both types of possible discontinuities by providing the above mentioned integrator, which controls an auxiliary vertical deflection system, and an intermediate storage which stores information regarding the start of each line. The main integrator will store error information of both types while the intermediate storage will store error information regarding the beginning of each horizontal line and this latter information is transferred to the main integrator before the beginning of each line. After the line has started for a short interval of time the information in the integrator is transferred to intermediate storage while feedback correction is taking place. Then the intermediate storage is cut-off from further transfer and the integrator continues to operate throughout the duration of the rest of the horizontal line with feedback providing the corrections. At the end of a horizontal line, on the right side, the information in the integrator due to feedback may be very different from what it was at the beginning of the line on the left side. This is due to the fact that the raster may deviate considerably from the actual direction of the strips. Then the intermediate storage's information regarding what the actual starting error should be, and which was derived at the beginning of the previous line, is transferred to the integrator to start the next line very nearly in the correct position. The cycle of events continues in this manner throughout the entire scanning operation.

A further refinement is possible when it is not feasible to maintain the required constant separation of the three beams on the screen throughout its entire area. Coming within the scope of this invention are, additionally, electron gun or guns of various forms including a single common cathode element with three control electrodes, three cathodes with one common control electrode, or three separate cathodes and three separate control electrodes. In some applications, after keeping the angular separation and distance between beams as small as possible, there are still some changes in convergence to different parts of the screen sufficient to significantly alter the spacing of the three beam spots on the screen.

The type of feedback correction mentioned above moves the three beams together in the up-and-down direction without altering the separation between them. It is also possible by the use of feedback control to cause a change of convergence of the beams such that their separation is altered and made it assume a standard value. This principle may be used with or without dynamic convergence. It can actually substitute for the latter and give the advantage of feedback correction. While this principle is known broadly to the prior art, the present invention achieves it with new and improved means.

It is another object of the present invention to provide the same oscillator and sensing means as used in the vertical feedback but with separate phase detection means to control the convergence of the three beams so that errors may be corrected. This is done by introducing the pilot carrier frequency to modulate two of the beams at phases less than 180° apart, or less than the absolute value of 90° such as 60° from reference phase. One phase detector or synchronous demodulator would extract the component in phase with the reference phase to control the dynamic convergence, while another phase detector or synchronous demodulator would extract from the sensed information the component preferably in quadrature with the reference phase. The latter extraction will control the vertical deflection feedback system. The speed of response of the convergence circuit is preferably kept much slower than the vertical circuit so that the latter will make its correction without interference from the former or vice versa.

In this connection, a further detailed object of the present invention is to use the beam shield and convergence electrode, referred to above, as the final means of controlling the convergence. The beam spots will be angularly spaced substantially 120° in order to make the gun structure physically realizable at small beam separation, while the two beams with pilot frequency modulation will be oriented along a vertical line. A circle of convergence is thus defined whose diameter is subject to change in accordance with the voltage on the convergence electrode.

The uncorrected error between the scanning raster and the horizontal color strips is a function of time and may be expressed as a constant error, or an error which changes linearly with time, or it may be expressed as a second degree curve such as a parabola. Errors expressible as higher degree curves than the second may also be considered.

It is a further object of this invention to specify the means by which these various types of errors may be greatly reduced in the feedback circuit. In general a single integrating circuit cancels out constant errors entirely and reduces linearly changing errors to a very small constant error. Double integration will take care of second degree errors by reducing the degree of the error by two leaving a final constant error greatly reduced in magnitude. This idea may be extended to triple integration and so on, although a single integrator will be sufficient for most applications. The integrator may be used also with or without a direct path from the sensed error to the deflection circuit in various degrees and combinations. With an adequate focusing system and small beam spot diameters the final error may be reduced to as low a value as is desired by increasing the open loop gain to a sufficiently high value.

It is a further object of the present invention to provide means for maintaining correct color registration when the sensed information is momentarily reduced or cut-off, or when interfering signals of a momentary nature or noise are present. The above integrating circuits, in accordance with this invention, provides a means to predict the errors when the errors are either of fixed value, changing by a constant rate, accelerating, or subject to a combination of these and other changes.

The above mentioned and other features, objects and advantages of this invention and the manner of attaining them will become more apparent and the invention itself will be best understood by reference to the following description of an embodiment of the invention, and to the appended claims, taken in conjunction with the accompanying drawings, in which:

Figure 1:
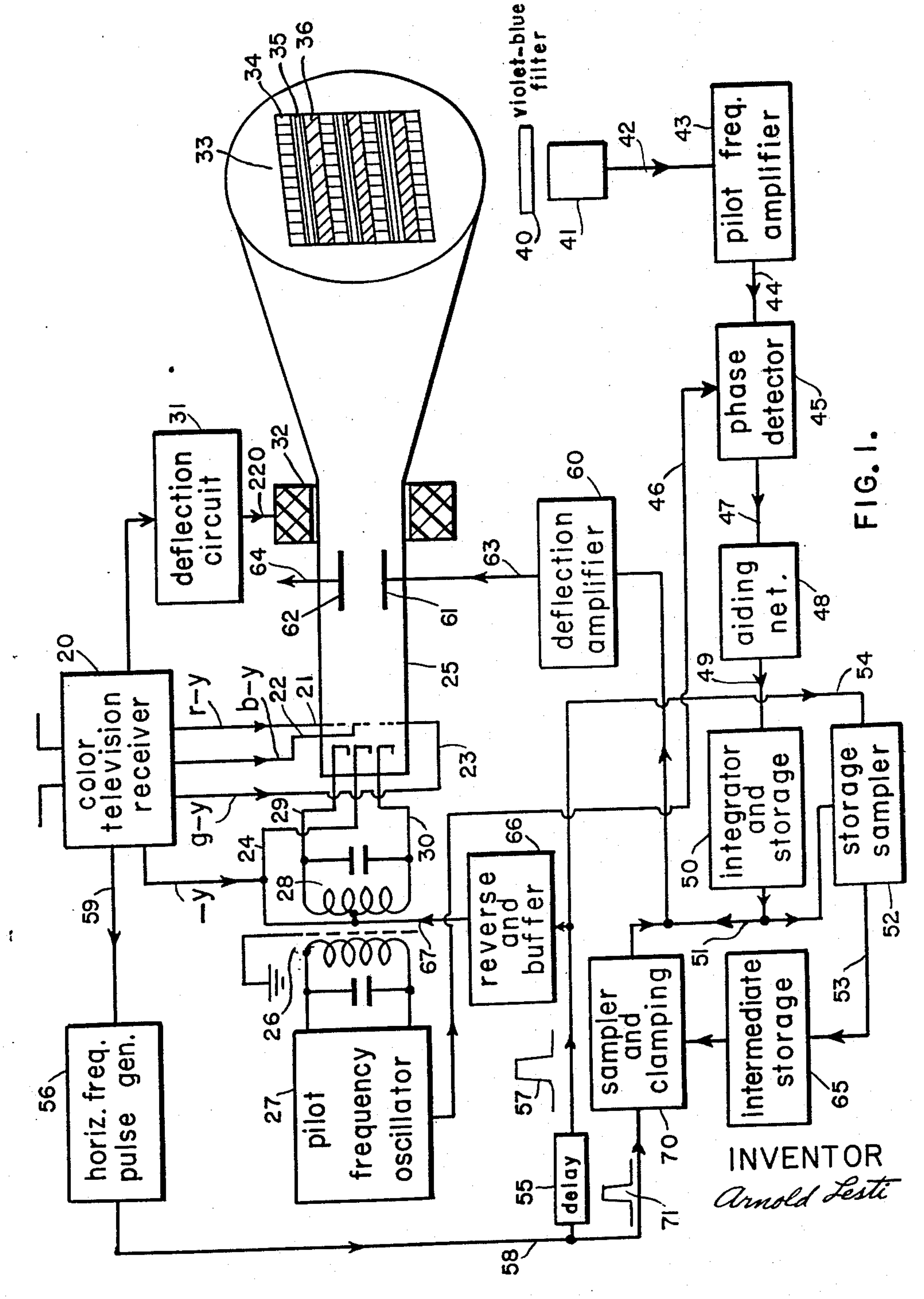
Fig. 1 is a block diagram of one form of the invention.
Figure 9:
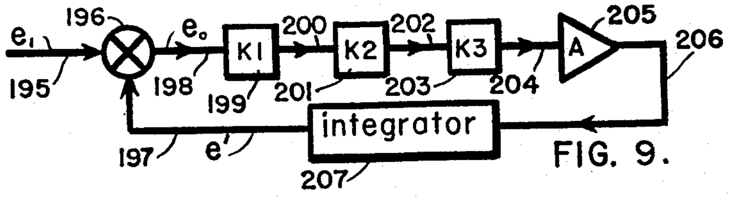
Figure 10:
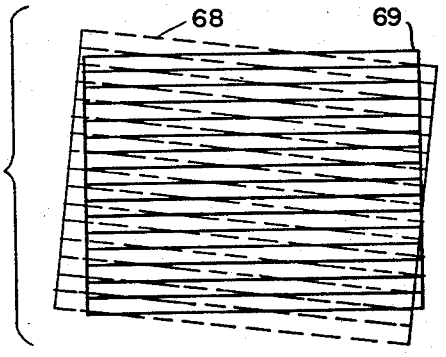
Figure 11:
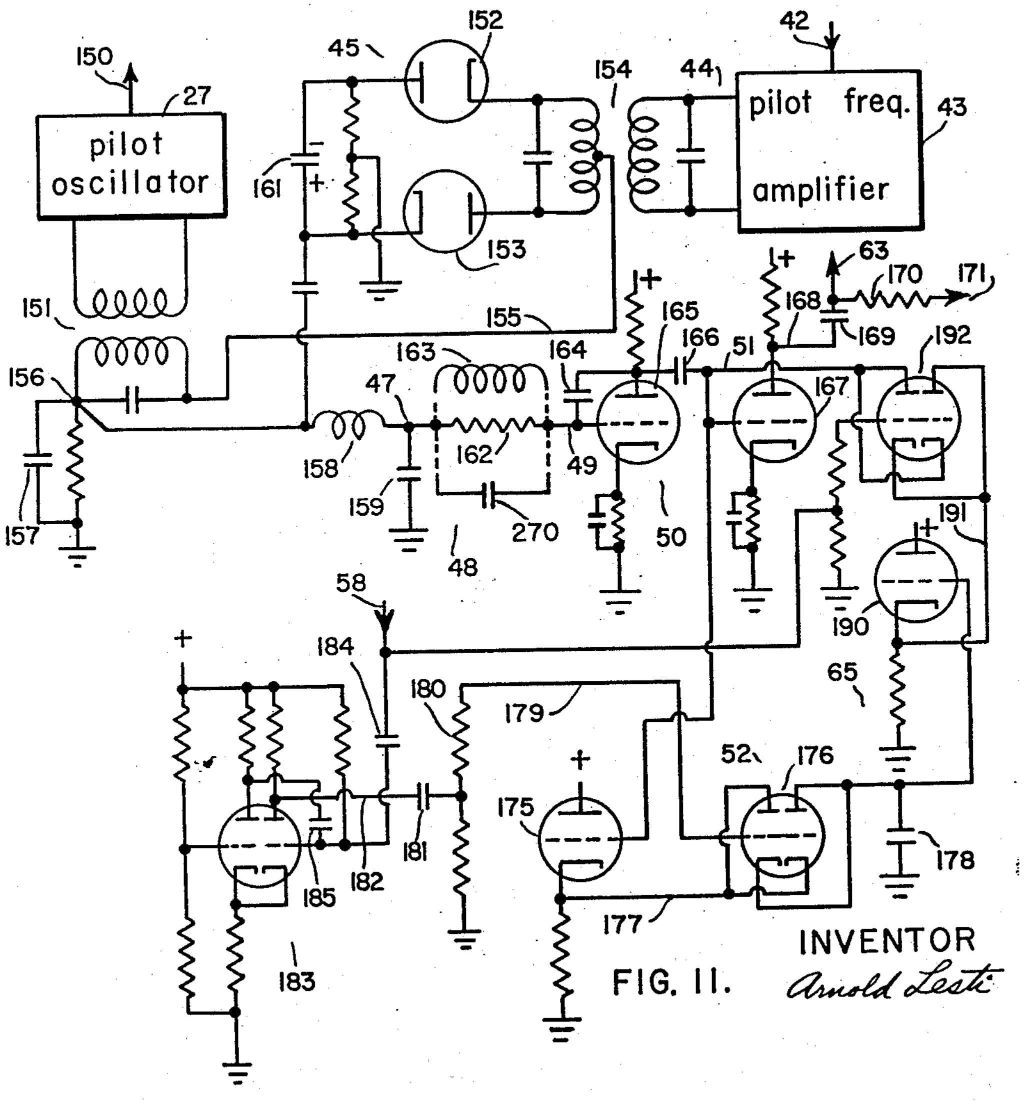
Figure 12:
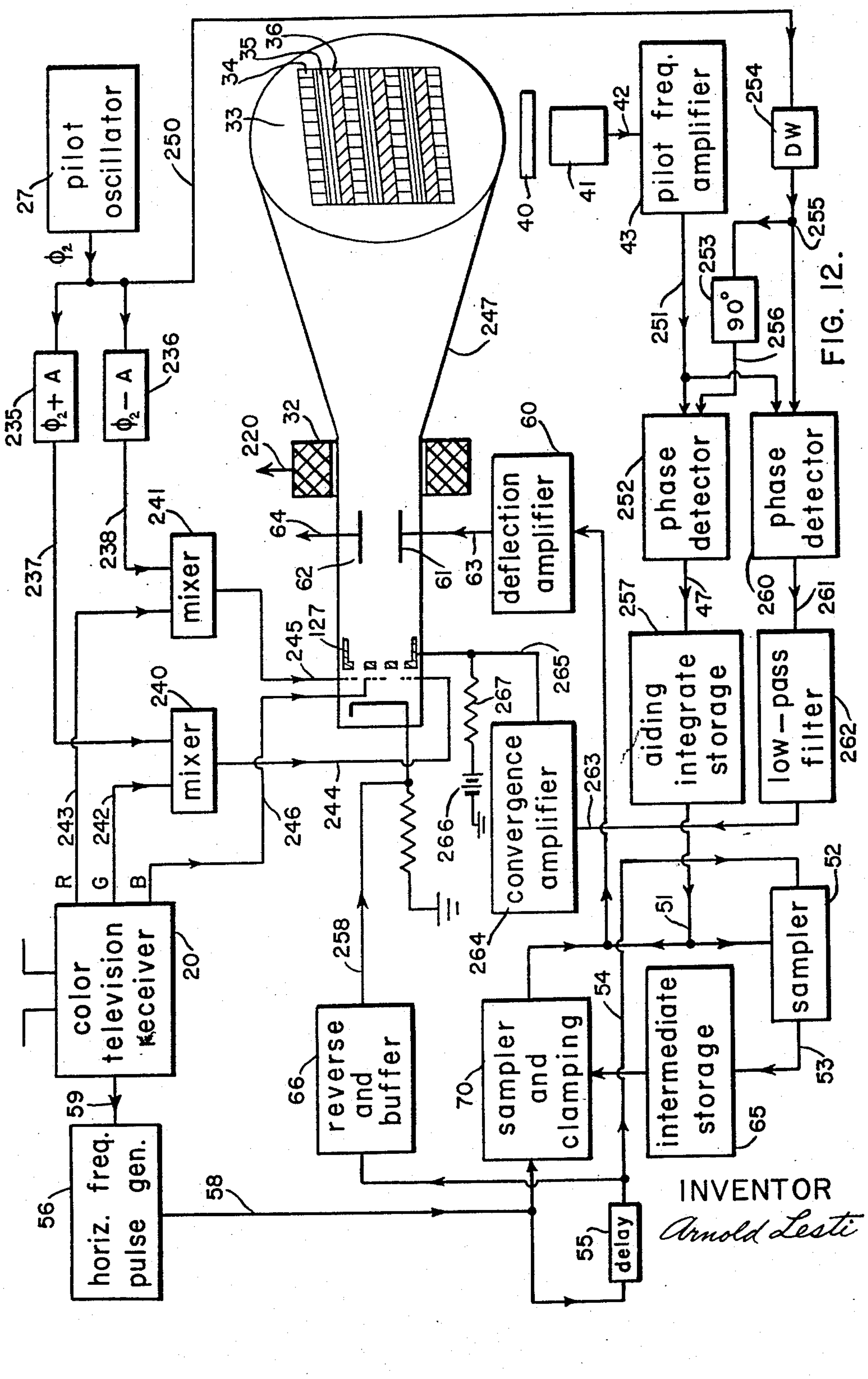

Fig. 9 schematically represents the feedback loop system;

Fig. 10 illustrates a typical mis-alignment between the scanning raster and the phosphor strips on the picture tube screen;

Fig. 11 is a detailed circuit arrangement illustrating one form of control for practicing the invention in the form diagrammed in Fig. 1; and Fig. 12 is a block diagram of another form of the invention using, additionally, feedback control of convergence in accordance with the invention.

In Fig. 1 there is shown a color television receiver 20 which may be used to receive color pictures. It delivers simultaneous color video signals consisting of the chrominance signals R—Y on bus 21, B—Y on bus 22, and G—Y on bus 23. The luminance signal —Y is placed on bus 24 which, in turn, applies it to all of the cathodes of picture tube 25. The action of this high level mixing circuit is to cause the signal components to add, yielding a net beam modulation of the red, blue, and green signals respectively by the action of the signal control electrodes connected respectively to buses 21, 22, and 23, and the luminance signal on the cathodes. This is a known and standard operation.

Color television receiver circuitry of the type suitable for blocks 20, 31, and 56 of Figure 1 for deriving red, blue and green signals together with the standard deflection and horizontal synchronization pulses may be found for example in "Color Television" a selection of articles from Radio & Television News, 1957 edition, published by Ziff-Davis Publishing Company.

In accordance with one preferred form of this invention a high frequency transformer 26 is provided whose primary is connected to the pilot carrier frequency oscillator 27, and the two ends of the secondary are connected respectively to the cathodes from which are emitted the red and green beams; that is one end 29 connects to the cathode whose control bus 21 passes red color information, while the other end 30 is connected to the cathode whose control bus 23 passes green color information. The center tap of the secondary winding 28 is connected to bus 24 which carries the —Y luminance signal. The oscillator 27 is of standard design, well known to the art, and examples may be found in a book entitled "Electron Tube Circuits," pages 244–270, published by McGraw-Hill Book Co., New York, 1950.

The transformer 26 provides a mixing circuit impressing high frequency sinusoidal voltages of equal amplitude but differing by 180° in phase on conductors 29 and 30. These voltages are preferably very small in amplitude and are superimposed on the color signal modulation. The red beam is thereby modulated by the regular red signal modulation added to a small high frequency signal of phase $\phi_1$. The green beam is modulated by the regular green signal modulation added to a small high frequency signal of the same amplitude and frequency as is applied to the red beam but of phase $\phi_1+180°$. The blue signal modulated beam is conventional and unaffected.

Under the influence of a conventional deflection circuit 31 and deflection yoke 32 the triple beam is caused to scan the screen 33 with a standard raster consisting of a series of substantially parallel horizontal lines scanned from left to right spaced in the vertical direction. Each of the three beams causes its own raster. Three separate rasters are displaced vertically by a small distance such that the entire space is covered by equidistant horizontal lines. Associated with cathode ray picture tubes there are accelerating, focusings, and heater electrodes and their power supplies which are obvious and well known to those skilled in the art, and are not shown in the drawings in order to avoid excessive details. In Fig. 1 the screen 33 comprises a series of phosphor strips such as red light emitting phosphor strip 34, blue light emitting phosphor strip 35, and green light emitting phosphor strip 36 on the inside of the front face of the tube. These are contiguous strips with or without a space between them. The other strips are consecutively arranged in the same order. Of course, instead of the sequence R, B, G, it is also possible to have R, G, B, if appropriate changes are made in the connections of the tube electrodes. In the particular adaptation of this invention illustrated in Fig. 1, the blue light emitting phosphor strips consist of a mixture of phosphor having medium or long persistence and a phosphor giving strong emission in the violet region of the spectrum and having very short persistence. There are preferably as many strips as there are scanning horizontal lines produced by the three beams. The mixed blue phosphor will give the proper color and will permit light modulations to be emitted in response to corresponding electron beam modulations at frequencies of ten megacycles per second or higher. This is necessary in order to pass the pilot frequency signals. The modulations are mostly violet light or a combination of blue and violet light modulations. The red and green phosphors are of standard material.

When the three beams impinge upon the phosphor strips light is emitted of a color which depends only upon the type of phosphor strip being struck, which may be either red, blue, or green, regardless of which of the three beams is involved. In the form indicated in Fig. 1 of this invention it is intended that the three beams will produce spots on the screen which are equidistant and separated in a vertical component by the spacing equal to that between the centers of two adjacent strips. The problem is to cause the red signal modulated beam to strike the red phosphor strip only, the blue signal modulated beam to strike the blue phosphor strip, and the green signal modulated beam to strike the green phosphor strip.

In accordance with a feature of this invention whenever a beam is striking the wrong phosphor strip a pilot carrier frequency signal in the form of violet-blue light modulations is produced. For example, if the three beams or triple beam is striking too low, the red modulated beam spot will be partly, if not all, on the blue phosphor. Since the red modulated beam has phase $\phi_1$ of the pilot frequency, violet-blue light modulated at that frequency and phase will be emitted. It is to be noted that under this condition the green modulated beam will not ordinarily be on the blue phosphor strip, except when the triple beam is greatly misaligned in convergence, which will be described hereinbelow. On the other hand, if the triple beam is striking too high, the green modulated beam spot will strike the blue phosphor. Since the green modulated beam has phase $\phi_1+180°$ of the pilot frequency, violet-blue light modulated at that frequency and phase will be emitted.

Figure 7:
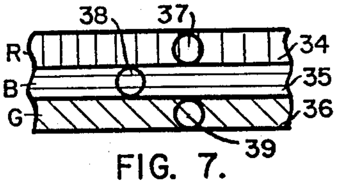
Fig. 7 illustrates a portion of the phosphor screen with perfectly aligned beam spots.

When the triple beam is centered perfectly, as in Fig. 7, and if the beam spots have a diameter less than the width of a strip, no violet-blue light is emitting modulation at the pilot carrier frequency.

The amplitude of the violet-blue pilot frequency modulated light will be in accordance with the degree of misalignment, while the phase gives information as to its direction.

When the triple beam is greatly misaligned both green and red beam spots will be simultaneously on blue phosphor strips causing cancellation wholly or partly of their individual modulations. This is a region which, when considered in the feedback loop, has unstable equilibrium, and the triple spots will tend to move away from it.

Refer to Fig. 7 for an illustration of perfect alignment of the modulated beam spot 37 on red phosphor 34, blue modulated beam spot 38 on blue phosphor 35, and green modulated beam spot 39 on green phosphor 36.

Referring again to Fig. 1, there is a violet-blue light filter 40 through which emitted light from the phosphor screen 33 passes before reaching photo-sensitive device 41, which may be preferably a photo-multiplier tube. This tube is responsive to the light which strikes it and produces output voltages on bus 42 proportional to the incident light. Detailed connections for the photo-sensitive device 41 may take any one of many standard forms one of which is shown in my Patent No. 2,706,216. Bus 42 feeds into pilot frequency amplifier 42 which has sufficiently wide band-pass characteristics to permit the required speed of operation as well as a low signal delay. The light filter 40 is optional when photo tube 41 is not sensitive to the violet and blue region of the light spectrum. The light filter is preferred in order to reduce the effects of ambient light and eliminate interference from green and red light.

The output of pilot carrier frequency amplifier 43 is applied to bus 44 from which it is fed to phase detector 45. The pilot frequency amplifier 43 is essentially a standard amplifier with a band-pass filter or it may be similar to the so-called intermediate frequency amplifiers. An example of such an amplifier may be found in "Radiotron Engineer's Handbook," page 1023, published by Wireless Press, Sydney, Australia, 1952. Bus 46 from the oscillator 27 supplies the reference pilot frequency to the phase detector at phase $\phi_1+DW$, where $\phi_1$ is the reference phase as applied to bus 29, D is the envelope or signal delay through the picture tube, sensing device, and amplifier 43, and $W=2\pi f$, where $f$ is the frequency of the pilot frequency oscillator. DW is the additional fixed phase shift necessary to give a true reference at the phase detector. The output of the phase detector on bus 47 is a positive or negative demodulated signal voltage. For example, if the violet blue light emitted due to a mis-alignment of the beam striking too low is from the red beam modulation, the phase is $\phi_1+DW$, and the output on bus 47 is positive. Whereas, if the violet-blue light emitted due to a mis-alignment of the beam striking too high is from the green beam modulation, the phase is $\phi_1+180°+DW$, and the output on bus 47 is negative.

The signal voltages on bus 47 are applied to aiding network 48 which partly predicts errors in case there is a temporary loss of sensing information. Aiding network 48 works in conjunction with the integrator and storage circuit 50 which is fed by the output of 48 through bus 49. The integrator serves to reduce errors further than would be the case without it. It completely eliminates constant errors in registration, and errors which are varying with time are greatly reduced, Details of the operation of the integrator will be set forth hereinbelow. The integrator has also storage means within it. However, additional storage is also provided which is subject to clamping as will be explained below. The output of the integrator and storage circuit on bus 51 is sampled by the storage sampler 52 which is essentially a gate which allows signal voltages to pass through from bus 51 to bus 53 at predetermined times. The signal which actuates storage sampler 52 is applied through bus 54. The signal is a slightly delayed pulse 57, derived through delay circuit 55 which, in turn, is fed from bus 58 and horizontal frequency pulse generator 56. The pulses at bus 58 occur during the retrace time of the horizontal scan. Unit 56 is driven by signals through bus 59 from receiver 20.

The signals on bus 51 are applied to deflection amplifier 60 which drives auxiliary deflection electrodes 61 and 62 through bus 63. Bus 64 is connection to the high voltage accelerating potential usually tied to the conductive coating on the inside of the envelope of tube 25. The high voltage supply and coating are not shown since their connections are standard and obvious to those skilled in the art. Details of connections of conductors 63 and 64 are shown further hereinbelow. Any signal voltage applied from amplifier 60 to deflection electrodes 61 and 62 will cause the triple beams to be deflected in accordance with the magnitude and polarity of the signal voltage, A positive voltage on bus 47, signifying that the triple beam is too low, will result in a correction signal voltage being applied to deflection electrodes 61 and 62 which will move the beam upward. Likewise, a negative voltage on bus 47, signifying that the triple beam is too high, will result in a correction signal voltage being applied to deflection electrodes 61 and 62 which will move the beam downward. In this manner errors of registration have a tendency to become corrected. A quantitative analysis of this is made hereinbelow.

Returning now to the voltage on bus 53 placed thereon by sampler 52, this voltage is fed into intermediate storage circuit 65. The time of occurrence of pulse 57 corresponds to a small portion of the left hand side of the raster. It is preferable, at the same time, to apply the pulse through the reverse and buffer circuit 66 to bus 67 which connects to bus 24. This action causes all the beams to be keyed on for a short time, notwithstanding the presence or absence of other signals. In this manner light is emitted for this interval at all positions on and near the left hand edge of the raster. It can be arranged that this narrow edge is placed behind a frame obscuring it from the viewers, but the photo-tube 41 is placed so that the light from this edge as well as the rest of the screen can reach it. Various other methods of positioning the photo-tube are set forth in my previous patents, above referred to.

Intermediate storage circuit 65 will store the correction voltage present on bus 51 due to feedback action at the time of occurrence of pulse 57 and corresponding to the corrections necessary on the left hand side of the picture. Such corrections may change for every horizontal line. As the scanning action takes place, a horizontal line is produced by the triple beam spots moving from left-to-right. Registration starts out correctly on the extreme left. The voltage established on conductor 51 is that which is required to give correct registration at the beginning of the line on the extreme left side. This voltage is sampled and placed in temporary storage by the intermediate storage circuit 65. As the scanning proceeds the triple beam will move towards the right. However, the raster might have a tendency to assume the shape as is indicated by the dotted lines 68 in Fig. 10, whereas the phosphor strips might be oriented as indicated by solid lines 69 in Fig. 10. Since the integrator 50 stores error information, as the beam moves the contents of the storage will change only when there is a change of error. For the same error, the stored information remains constant. As the triple beam moves towards the right the error voltage established on conductor 51 and held there by storage may become quite large due to the large deviation between the uncorrected raster 68 and phosphor lines 69. On the extreme right side an error of 5 to 10 lines is possible. The correction for this error at the end of the scan of a horizontal line on the extreme right might be a large error voltage on bus 51 which differs greatly from the value of the error voltage at the beginning of the scan of the same horizontal line. When retrace occurs and the next line below is started, the error voltage on conductor 51 would be that which existed at the end of the preceding line, if nothing is done to change it. Such an error voltage would start the next line in gross deviation from its correct position. Instead of starting in its proper place it might start lower or higher by many multiples of the distance between three strips. Feedback would only tend to place the triple beams correctly in the nearest set of phosphor strips, which might be far from the correct set of strips.

This difficulty is avoided by the use of the intermediate storage circuit 65. During the time of retrace sampler the clamping circuit 70 is activated by pulse 71 on bus 58 and derived from 56. Circuit 70 is a gate which transfers stored voltage in 65 to conductor 51 during the time of retrace and prior to the actual start of the horizontal line. In this manner when the next line, above referred to, starts, conductor 51 and its associated storage circuit is impressed with an error voltage which was necessary to maintain the beam spots at the extreme left of the previous line in correct registry. This voltage will be very close to the error voltage necessary for the correct starting registry of the new line. Feedback will then correct for the minor deviations, and a slightly changed error voltage will be placed on conductor 51 by feedback control. Such a new voltage is sampled by the storage sampler 52, and a new cycle starts, and so on for scanning the entire raster. It is to be noted that pulse 71 occurs before pulse 57. Also, pulse 57 may be widened more and have a duration into the actual viewing area, while bus 67 and circuit 66 may be dispensed with. However, the circuitry of Fig. 1 is the preferred form.

My previously issued patents, referred to above, disclose various other possible ways of providing auxiliary deflection means including the use of additional coils for magnetic deflection. These are applicable to the present invention.

Figure 2:
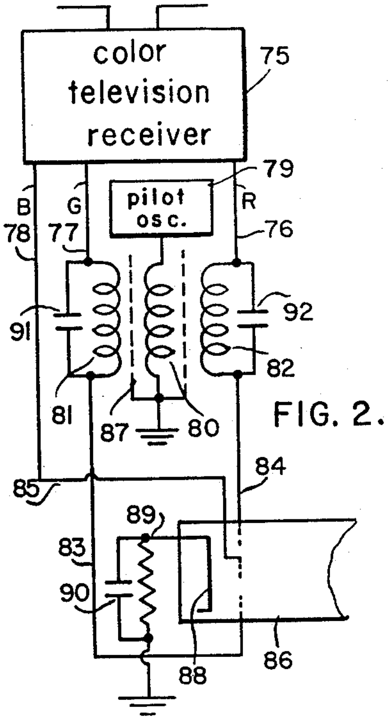
Fig. 2 is a view representing an alternative form of mixing the pilot frequency into two of the three beams of the picture tube, in accordance with the invention.

Another manner of mixing the pilot frequency into two of the three beams is illustrated in Fig. 2. In this figure color television receiver 75 uses low level mixing of the chrominance and luminance signals and the red, green, and blue chrominance signals are available respectively on buses 76, 77, and 78. Pilot frequency oscillator 79 drives a primary coil 80 to which is inductively coupled two secondaries 81 and 82. The secondaries are tuned by capacitors and are in series with buses 76 and 77. That is, the green signal bus 77 connects to coil 81 which, in turn, is connected to bus 83 which leads to the green beam control grid of cathode ray picture tube 86, a portion of which is shown. Likewise, red signal bus 76 connects to coil 82 which, in turn, connects to bus 84 which leads to the red beam control grid of tube 86. The blue signal bus 78 connects to bus 85 which leads to the blue beam control grid. The primary of the transformer is shielded from the secondaries by shield 87. This prevents capacitive coupling between the red and green video signals. Tube 86 is shown with a common cathode 88, although three separate cathodes, if present, could be connected together. Circuit point 89 could be connected to bus 67 of Fig. 1. Under this latter condition capacitor 90 would be either eliminated or greatly reduced in value. Adjustment of the phase of the pilot frequency voltages impressed on buses 83 and 84 may be done first by reversal of the winding of coils 81 and 82 in relation to each other and then by adjustment of the capacity values of capacitors 91 and 92. While the value of the phase difference of 180° has been specified for circuits of the type illustrated in Fig. 1 because for those circuits it is optimum, it is possible to use other values. The type of mixing illustrated in Figures 1 and 2 are possible because the pilot frequency is much greater in value than the video frequencies, so that the tuned circuits of the coils in the mixing circuits offers little impedance to the video signals.

Figure 3:
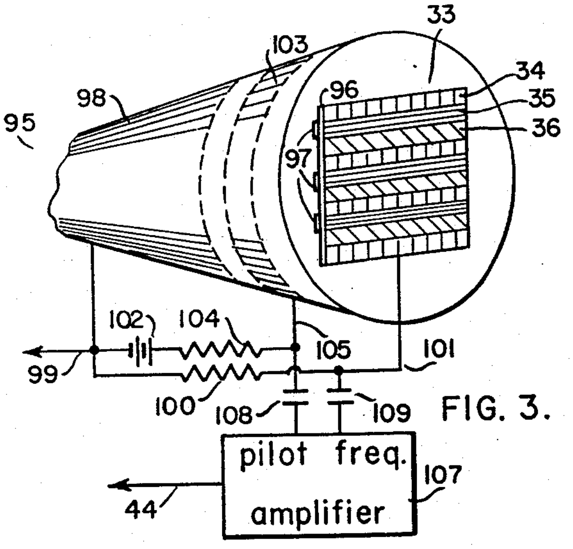
Fig. 3 is a view representing alternative means of sensing emitted energy from the screen using secondary emission, adaptable to the invention.

Fig. 3 illustrates another emission and sensing technique which may be adapted to the invention. Cathode ray picture tube 95 is illustrated in part with phosphor screen 33 and phosphor strips such as 34, 35, 36 which will emit red, blue, and green light respectively when struck by the electron beams. Each strip extends horizontally as shown and the different strips are vertically spaced, in a manner similar to those of tube 25. The phosphor may be backed by an aluminum layer 96 in a conventional manner. Phosphor strips of any one of the three colors may be chosen such as the blue and a series of other strips 97 may be laid down throughout the entire horizontal length directly behind the blue strips on the aluminum coating. These strips 97 may consist of magnesium oxide to give a greater secondary emission ratio than aluminum when struck by the beams. An interior coating 98 connected to a high potential bus 99 serves to act as the high voltage accelerating electrode for the tube. The same voltage is applied to the aluminum coating via resistor 100 and conductor 101. A source of voltage 102 is applied to isolated internal coating 103 through resistor 104 and bus 105. When the electron beams strike the emission strips 97, secondary electrons are emitted which are attracted towards coating 103 since its potential is positive with respect to the aluminum coating 96 and strips 97. A signal potential between buses 101 and 105 may be thus established which is transferred to pilot frequency amplifier 107 via capacitors 108 and 109. A tuned circuit may be placed at the output of the capacitors.

In accordance with the present invention the new manner of using the above is as follows:

Since the beam spot diameter is less than the width of strips 97, under conditions of perfect registration, such as is illustrated in Fig. 7 which also applies to the present case, there will then be no electrons emitted from strips 97 carrying the pilot frequency modulation. When the beam intended for the red strips strikes any strip 97 the phase at the input of 107 minus a constant is equal to that at bus 29 of Fig. 1, while when the beam intended for the green strips strikes 97, the phase at the input of 107 minus the same constant is equal to that on bus 30 of Fig. 1. Instead of buses 29, 30 of Fig. 1, buses 84, 83 of Fig. 2 may also be cited. The pilot frequency signal entering amplifier 107 has phase characteristics which gives the direction of mis-alignment, in a manner similar to the signal on bus 42 of Fig. 1. The need for downward correction is given by a signal of the same pilot frequency but which differs by substantially 180° from the signal which gives the need for upward correction. While 180° is preferred other angular differences are possible such as 120°, for example. When convergence feedback control is also used, as explained hereinbelow, a phase less than 180° is necessary and about 120° is preferred.

For the present invention it is preferred to use a gun structure which would approximately resemble a single gune to outward appearance. The beam spots should be positioned in a permanent relation between each other. Change of convergence should not alter the ratio of the distances between the projected spots. Small spot size and small separation are necessary. The axes of the beams should be close together and converge at a very slight angle. Although the beams may cross before hitting the phosphor screen, this is not necessary for they can cross virtually beyond the screen nearer to the viewer, or if the separation is close enough at the crossing points, the beam axes can be nearly parallel.

The above type of source for the electron beams will greatly reduce errors due to changes of convergence in relation to spot separation on different portions of the screen as a result of the action of the deflection system.

Figure 5:
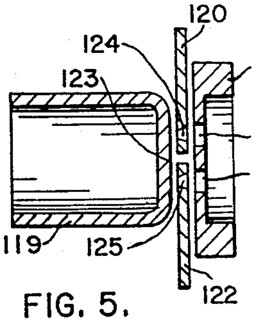
Fig. 5 is a sectional view along the line 5—5 of Fig. 4.
Figure 4:
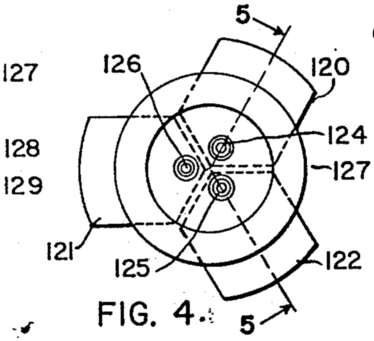
Fig. 4 is an enlarged front face view of portions of the electron gun using a common cathode, three control elements, and a beam shield and convergence electrode, in accordance with one embodiment of the invention.

A portion of a gun structure is illustrated in Figures 4 and 5 in enlarged form. The cathode 119 is shown with a hollow space for the heater, which is not shown. The cathode is coated at 123 over a sufficiently large area to permit electron emission of the three regions where the beams start. Signal electrodes 120, 121, and 122 are set in at 120° angular spacing. These are flat coplanar members with small holes 124 125, and 126 through which the red, blue and green modulated beams pass. Small holes on thin coplanar members very close to the cathode will cause small electron beam crossover points to be established slightly to the right of the left side of each hole. Signal modulating voltages applied between electrodes 120, 121, and 122 and the cathode will cause a change of intensity of the beams in accordance with the respective modulations. To match the phosphor configuration shown in the other figures electrode 120 should be connected to the red signal bus, while electrode 121 should be connected to the blue signal bus, and electrode 122 should be connected to the green signal bus. This applies to Figures 2 and 12, while for Fig. 1, the corresponding chrominance color difference buses are connected, such as 21, 22, and 23. The 120 degree angular spacing illustrated makes possible close separation between the holes 124, 125, and 126, while still permitting adequate structure for the control electrodes which may be supported by ceramic members, not shown, outside of the region of the beams. Member 127, with holes to match those of the signal electrodes, is spaced close to the signal electrodes to act as a shield to prevent interference of the signals by electrostatic coupling. Holes 128 and 129, for example, match corresponding holes 124 and 125 respectively of the control electrodes. The other hole to match 126 is not marked on Fig. 4, and not shown on Fig. 5. Member 127 further acts as a convergence electrode by connecting it to a suitable voltage source. By varying the voltage on member 127 changes of convergence of the three beams may be accomplished without significantly changing the focusing of the beams. Other parts of the gun structure are conventional and not shown.

One form of detailed circuitry of the block diagram illustrated in Fig. 1, with or without the adaptations shown in Figures 2 and 3, is diagrammed in Fig. 11. In the latter figure lead 150 corresponds to the input to transformer 26 of Fig. 1 or coil 80 of Fig. 2, while transformer 151 is fed from oscillator 27. In Fig. 1, this corresponds to the connection to the phase detector 45 by bus 46. In Fig. 11, the phase detector 45 has diodes 152, 153 connected by transformer 154 from pilot frequency amplifier 43. The latter is fed from the sensing means through bus 42. Substituted for 42 and 43, it is possible to use amplifier 107 with input capacitors 108 and 109. Other sensing means may be used. The amplified frequencies from 43 are applied to the phase detector 45 in a known and standard manner. The reference phase from the pilot frequency oscillator is fed to the phase detector via bus 155 to the center-tap of the secondary winding of transformer 154. A phase demodulated signal voltage is established at circuit point 156. This signal is filtered by capacitor 157, coil 158, and capacitor 159, so that it results, at circuit point 47, in a demodulated voltage, free from high frequency components of the carrier and its harmonics, and containing error sensing voltages of positive or negative polarity, which depend upon the phase of the carrier delivered at bus 42 or the corresponding circuits in the other adaptations.

The form of phase detector shown in Fig. 11, referred to as a ratio detector, is only one of many forms which the detector can take for use in this invention. The capacitor 161 stores self-biasing voltage proportional to the intensity of the signals. If the oscillator signal is very large compared to the error signal from 43, then the voltage across capacitor 161 will be determined mostly by the oscillator voltage, and the error signal voltage, will be superimposed on it, with due regard to the phase relation, to produce a demodulated signal on terminal 47. The phase detector will pass amplitude changes of the high frequency signal from amplifier 43 and produce demodulated signals at 47 with amplitude variations, as well as polarity values dependent upon the phase relationship between the signals from amplifier 43 and oscillator 27. A phase detector may be used without the charging condenser 161, with diodes connected straight instead of reversed as shown and with such other changes as are well known to those skilled in the art.

Circuit point 47, Fig. 11, serves as the input to the aiding net 48, consisting of resistor 162 used by itself, inductance 163, or the combination of the two used together. A capacitor 270 may also be included. When it is connected to terminals 47 and 49 respectively, a direct path component is obtained without integration to the deflection circuit if resistor 162 is disconnected. If the latter is also connected a combination of direct and integrated operation is obtained. Inductance 163 can be connected or not to superimpose its effects. The output of 48 at 49 serves as the input of the integrator and storage circuit generally represented by 50 in Fig. 11. This latter circuit consists of the integrating capacitor 164, tube 165, and coupling capacitor 166, and other related elements. Capacitor 166 is also used for clamping, as explained below.

The error signal $e_1$ at circuit point 47 serves as the input to the integrator consisting of resistor 162 having resistance expressed by R and capacitor 164 having capacity expressed by C, tube 165, and other related elements. Assume a low source impedance for point 47, or absorb it in resistance R. If the gain of the tube is sufficiently high the signal output of the integrator on bus 51 is approximately expressible as $e_0=1/RC\int e_1dt$.

Assume that the inductance 163 is not connected. The time constant of circuit 50 is given approximately by RCA, where A is the absolute value of the gain of the amplifier. This time constant must be large compared to the period of one horizontal line, that is, about 1/15,000 second, but it must be so large that $1/RC$ becomes too small, which would reduce the value of $e_0$ attainable in the short period of time in which control is to be significant. The desirable condition is to have RC small and A as large as possible. While the amplifier giving open loop gain A of integrator 50 is shown in Fig. 11 with one tube, it is possible to substitute more stages of amplification to obtain a higher gain for the integrator amplifier, if necessary. A value of $RC=2\times10^{-6}$ seconds can be obtained with $R=4000$ ohms and $C=500$ micromicrofarads. With a gain of $A=200$, $RCA=4\times10^{-4}$ With $t=70$ microseconds, which is greater than the duration of one horizontal line, $$e-\frac{t}{RCA}=.84$$

which represents a holding loss of 16% in about the time taken by one horizontal line. For some applications this is adequate because integration need not be perfect over this period. Also, there is a clamping circuit, described below, which restores slow varying components, line-by-line, for the duration of the whole raster. The above calculations are given by way of example only. Other values can be used to lower the holding loss of the integrator, without sacrificing the signal value generated in periods of time in which control is to be significant. Moreover, any other suitable type of integrator may be used.

Returning again to Fig. 11, the integrated signal voltage is transferred through capacitor 166 to bus 51. Bus 51 is connected to the control grid of tube 167 which, with its associated components, serves as an example of the deflection amplifier 60 of Fig. 1. The amplified signal output at 168 is applied through capacitor 169 to bus 63 which is also shown in Fig. 1. Bus 63 is connected to the electrostatic deflection plate 61 of the auxiliary deflection system. The other plate 62 is tied to bus 64 which, in turn, is connected to the high accelerating voltage source for the picture tube. That same conventional high voltage source, not shown, is also connected to bus 171 shown in Fig. 11, while this bus 171 is connected through resistor 170 to bus 63, biasing it and the deflection plate 61 to the same high voltage. This permits control voltages to be applied to the plates, while the bias voltage maintains them at the same average potential as the conductive coating on the internal walls of the tube. The error signal voltages applied to the deflection plates serve to move the triple beam in a vertical direction, either up or down, to correct for errors in registration.

Assume that the triple beam is on the left side of the picture starting a horizontal line. To make certain that the beams will be fully on at the time, the cathode or cathodes of the picture tube are keyed by a negative pulse from unit 66, Fig. 1. Unit 66 may consist of a standard one-tube reversing amplifier whose input connects from bus 179, Figure 11, and whose output may be capacitively coupled to bus 24, Figure 1. Then by feedback control theory, as will be further explained hereinbelow, the voltage on bus 51, referring to Fig. 11, is adjusted automatically to such a value as to cause a correction voltage to be placed on the auxiliary deflection plates of a polarity and magnitude such as to either eliminate or greatly reduce the error. The error voltage on the plates has a sense which is opposite to the equivalent error voltage existing in the regular deflection system of circuit such as 31 and deflection yoke 32. The latter error voltage may be considered as a voltage which is a deviation from the true deflection voltage, as a function of time, which would produce perfect registration. The feedback control system must establish true deflection voltage by cancelling most if not substantially all of the error voltage. At the beginning of the horizontal line the error voltage established on conductor 51, referring to Fig. 11, is to be sampled and stored in order that the initial starting error voltage may be available later for the start of the next horizontal line. The error voltage on bus 51 is transferred to cathode follower 175. An equivalent error signal voltage is placed on bus 177 at low impedance due to the cathode follower action. The sampling switch 176 is essentially a gate which, when operative at predetermined intervals, causes the voltage on bus 177 to charge capacitor 178. The time constant of this charging circuit is very short due to the low impedance at bus 177 and of the switching, gating, or sampling tube 176. Capacitor 178 is small in value, but not so small that its charge will leak off significantly during the time of one horizontal scan of one line. Sampling switch 176 is made up of two tubes whose grids are tied together, while the plate of one tube is tied to the cathode of the other, and vice versa. One of the pair of elements connects to bus 177, while the other goes to the capacitor 178. The control grids are connected to bus 179 which, in turn, connects to limiting resistor 180, capacitor 181, bus 182, and to the plate of the tube which is normally conductive of one of the two tubes of the monostable multivibrator 183. The latter is conventional. Bus 58 which carries the horizontal frequency pulse from unit 56, is applied to the control grid of the tube which is normally conductive via differentiating capacitor 184. When the pulse on 58 is positive no change in 183 takes place, since the grid shunts the positive signal to cathode and the tube is already conducting. At the trailing edge of the pulse on bus 58 which occurs at a time suitably delayed or a trailing negative swing, differentiation by the small capacitor 184 in conjunction with the load on the grid, will cause a negative going pulse to develop on the grid of sufficient magnitude to block or cut-off the tube. Then the other member of the pair of tubes of 183 starts to conduct, and by the well known action of this type of circuit a positive pulse is generated on bus 182 which is applied to the grids of gate tube 176. Capacitor 185 can be adjusted to determine the duration of the pulse at 182. The left hand member of the pair of tubes will remain conducting for a time determined, among other factors, by the value of capacitor 185. The right hand member will again conduct and the circuit is ready for the next pulse from bus 58. The time of occurrence of the pulse into the grids of gate 176 is after the horizontal retrace, and during the beginning of the movement of the beams on the left hand side of the picture. Its duration should be preferably short. Feedback control takes place during and after its occurrence and error voltages on bus 51 continue to be modified according to requirements. The voltage injected into capacitor 178, when the positive pulse on bus 179 renders 176 conductive for either relatively positive or negative voltages on bus 177 in relation to the voltages which may exist from previous storage on capacitor 178, represents the latest error voltage on 51 just before the keying pulse on bus 179 ceases.

Intermediate storage unit 65 consists of the capacitor 178 and cathode follower tube 190 as a possible form. Stored error signal voltages on 178 are impressed on the control grid of tube 190 and appear on bus 191. When sampler 192 is keyed to conduct, by the pulse from bus 58 arriving on its control grids, the stored error voltage on bus 191 is transferred to bus 51. The time constant of this charging circuit is short, permitting a quick charging of capacitor 166. Since the horizontal frequency pulse on bus 58 occurs at the time of retrace, capacitor 166 is charged with the stored voltage on capacitor 178, as represented by voltage on bus 191, prior to the charging of capacitor 178 by the operation of gate sampler 176. It is to be noted that sampler gate 192 is connected in a similar manner as 176, having two tube sections, with opposite plates and cathodes tied, while the control grids are connected together. Sampler 192 is one form of unit 70 shown in Fig. 1, while sampler 176 is one form of unit 52. Other types of circuits are possible to perform the same or analogous functions.

In Fig. 11 sampler 192 clamps the voltage on bus 51 to that of bus 191, whenever 192 is rendered conductive by pulses from 58. After charging and clamping the voltage on bus 51 will thereafter change, from the reference established by the clamping, by the error signal voltages applied through capacitor 166 from tube 165. The initial clamping voltage is transferred to the control grid of tube 167 which amplifies it and drives the deflection plates to move the beam spots for approximately correct starting on the left side of the picture. Feedback control will accurately change the voltage on bus 51, via capacitor 166, to establish correct registration very quickly. The gate 176 then operates to charge capacitor 178 to the new voltage. The error voltage on bus 51 continues to change, from the initial reference, as the beams move from left-to-right, in accordance with feedback requirements as set forth in more detail hereinbelow.

In Fig. 9 there is illustrated the feedback diagram applicable to this invention. Equivalent error voltage $e_1$ is designated applied to bus 195. As a result of the feedback action the circuit sets up a voltage $e'$ as close to the original uncorrected equivalent error voltage $e_1$ as possible. Character $e'$ is shown applied to bus 197. There is a difference circuit designated as 196 which substracts $e'$ from $e_1$. That is, it takes $e_1-e'=e_0$. The final equivalent error voltage $e_0$ is applied to bus 198. The equivalent error voltage $e_1$ is that voltage which when applied to the deflection system by the auxiliary deflection capacitors has the effect of causing deviations of registrations which are equivalent to those actually present from the regular deflection circuit. Such deviations are with respect to reference voltages which produce perfect registration. K1, illustrated in block 199, refers to the ratio between the actual beam deflection on the screen such as in inches divided by the deflection voltage required on the deflection plates to produce that beam movement. On bus 200 there is no voltage, since the representation here is in displacement of the spots on the screen from one position to another, due to voltages at bus 198. The sign on bus 200 is given by the direction of displacement. K2, illustrated in block 201, represents the ratio between the actual light flux emitted containing the pilot carrier frequency divided by the actual beam displacement on the screen required to produce it. Bus 202 carries information on intensity of light flux whose sign is given by the phase of the carrier frequency which modulates the light flux. The sign is governed by the direction of displacement which brings either the red signal modulated beam into the blue light emitting phosphor giving one phase and hence sign, or the green signal modulated beam giving the opposite phase and sign. K3, illustrated in block 203, represents the ratio between the actual photo-tube output volts produced divided by the carrier modulated light flux required to produce it. Bus 204 carries voltage information which is applied to the input of amplifier 205. The latter is a collection of all the various amplifications in the loop and has gain A. By taking the product (K1)(K2)(K3) =K the result is a scalar ratio between voltage produced at bus 204 divided by the voltage applied to bus 198 required to produce it. By suitably multiplying an equivalent error voltage by K1, the corresponding error in displacement or mis-alignment is given; or by multiplying the equivalent error voltage by (K1)(K2), the corresponding error in unwanted blue light flux is given. In this analysis linearity is assumed in the transfer characteristics of blocks 199, 201, and 203, giving constant transfer characteristics K1, K2, and K3. While it is realized that this is an approximation only, it nevertheless substantially describes the operation.

The signal voltage on bus 204 is amplified by amplifier 205 with gain A and delivered to bus 206. Bus 206 serves as the input to integrator 207, which integrates the voltage on its input and delivers output on bus 197. The latter output is the equivalent error correcting voltage $e'$, referred to above.

After multiplying $e_0$ by K and amplifying by A, the voltage at bus 206 is given by $KAe_0$. At bus 197, as a result of integration, there is obtained, $e'=VKA\int e_0 dt$, where V is a constant transforming the results of integration into the proper voltage units. For example, in Fig. 11, the integrator 50 has $$V=\frac{1}{RC}$$

with dimension of the reciprocal of time. The feedback relation is such that $$e_1-e'=e_0 \quad (1)$$

By substituting there is obtained, $$e_1-VKA\int e_0 dt=e_0 \quad (2)$$

Differentiating and rearranging, $$\frac{de_0}{dt}+(VKA)e_0=\frac{de_1}{dt} \quad (3)$$

$$e_0=e^{-VKAt}\int\frac{de_1}{dt}e^{VKAt}dt+c_1e^{-VKAt} \quad (4)$$

In this equation $e_0$ is the final error equivalent corrected voltage, and $e_1$ is the gross error input equivalent volts which would be present without feedback correction, and $c_1$ is the constant of integration.

One may consider $e_1$, the error driving function, as a function of time. If $e_1=h$, a constant then, $$e_0=c_1e^{-VKAt}$$

If it is assumed that there is an initial error voltage present in the deflection system equal to $g$, then at $t=0$, $e_0=g$ or $e_0=ge^{-VKAt}$. Since AK is large and the smallest $t$ under consideration is of the order of RC, and since $$V=\frac{1}{RC}$$

while K may be of the order of unity, the error will reduce to a very small value or practically zero because A is large. Therefore, if the equivalent error driving function is a constant, the presence of integration in the feedback loop will result in a final error which is zero, and if a spurious voltage or initial error exists in the system, this will be quickly reduced to zero. Because of unit 196, Fig. 9, as the final subtractor, the sense of all other operations is positive. That is V, K, A, has a positive product.

If the driving error function is $e_1=ht$, which is a likely type of error function as is evidenced by Fig. 10. That is, the error is a linearly increasing or decreasing function of time. Then $$\frac{de_1}{dt}=h$$

and (4) becomes $$e_0=e^{-VKAt}\frac{h}{VKA}e^{VKAt}+c_1e^{-VKAt} \quad (5)$$

If the initial conditions are as above, then $$e_0=\frac{h}{VKA}(1-e^{-VKAt})+ge^{-VKAt} \quad (6)$$

After a very short interval of time the initial errors are reduced to insignificant values, and the error reaches, $$e_0=\frac{h}{VKA}$$

Since the denominator VKA is very large $e_0$ is small which is the final error. That is, even through the error function gets larger and larger, the final error quickly becomes a fixed constant of small value. It is to be noted that the units in Equation 7 are dimensionally correct, since $h$ has the dimension of voltage divided by time, V is the reciprocal of time, while KA is a large dimensionless scalar. Thus time cancels out leaving a voltage divided by a larger scalar. As previously noted A can be made so large that the error is reduced to a value so small that no objections to it can be given.

A more complex situation can be dealt with in which the driving error function can be expressed approximately as a second degree function. For example $$e_1=\frac{h_1}{2}t^2+h_2t+h_3$$

where the $h_i$ are constants. Better reduction of this type of error can be obtained if double integration is used. In Fig. 11, if coil 163 is tied to terminals 47 and 49 and resistor 162 is left in the circuit the relation between an input $KAe_0$ at terminal 47 to the output at terminal 63 will be a double and single integration. If the error voltage at 47 is $KAe_0$ at the output 63 it will be of the form, $$V_2KA\int(\int e_0dt)dt+V_1KA\int e_0dt \quad (7)$$

In one application of this expression $$V_1=\frac{1}{RC}$$

while $$V_2=\frac{1}{LC}$$

$V_2$ has the dimension of the square of the reciprocal of time, since integration is carried on twice. This expression indicates that the resistance 162 causes the single integration, while the inductance 163 causes the double integration. This type of double integrator may be used for integrator 207 in Fig. 9, and Expression 7 may then be considered equivalent to $e'$ in Equation 1. In that case, $$e_1-V_2KA\int(\int e_0dt)dt-V_1KA\int e_0dt=e_0 \quad (8)$$

Differentiating (8) twice and rearranging, $$\frac{d^2e_0}{dt^2}+V_1KA\frac{de_0}{dt}+V_2KAe_0=\frac{d^2e_1}{dt^2} \quad (9)$$

Since $$\frac{d^2e_1}{dt^2}=h_1$$

this may be substituted in Equation 9 and the solution will then be of the form, $$e_0=c_1e^{a_1t}+c_2e^{a_2t}+\frac{h_1}{V_2KA} \qquad (10)$$

in which $$a_1=\frac{-V_1KA}{2}-\frac{1}{2}\cdot\sqrt{V_1^2K^2A^2-4V_2KA}$$

and $$a_2=\frac{-V_1KA}{2}+\frac{1}{2}\cdot\sqrt{V_1^2K^2A^2-4V_2KA}$$

while $c_1$ and $c_2$ are constants whose values are determined by the initial conditions. The terms $a_1$ and $a_2$ can be made to have large negative values by suitable choice of the parameters to give fast decay. The terms within the square root sign should be kept small, and if imaginary the root term gives the frequency in radians per second of the quickly damped oscillations, since $-V_1KA$ is very large and can always be made negative. The error then is expressed by $$e_0=\frac{h_1}{V_2KA}$$

which is very small. Since $h_1$ has the units of volts per second per second and $V_2$ has the same time units, while KA is dimensionless, the expression is in volts. It can be transformed into final error displacement on the screen by multiplying it by K1, or into light flux error by multiplying it by (K1) (K2). In this manner the original error which is expressed by a general second degree curve and whose value changes with time and may become quite large, is quickly reduced by the feedback circuitry to a very small constant value.

The double integrating circuit, illustrated in Fig. 11, is only one of many forms which such circuits can take. In accordance with this invention any other type of integrator, or integrators may be used. For example, other forms of integrators may be used as described in the book entitled "Waveforms" published by McGraw-Hill Book Co., Inc., New York, New York, in pages 662–666 and other pages. The use of a combination of single and double integrations as described above, by way of example, in connection with Fig. 11, may be done also by using a single integrator between buses 206 and 197, in Fig. 9, and two integrators in series also connected between the same buses, with suitable decoupling and mixing units to set up the operating Formula 7 given above. In Fig. 9, block 207, also represents generically any combination of one or more integrators, including a direct path between 206 and 197. The direct path component may be obtained, for example, by connecting capacitor 270 to circuit points 47 and 49, Fig. 11, and the degree to which this component affects the operation can be altered by changing the value of the capacitor. By direct path is meant that, by itself, it would have no integrative or memory action of position or rates. It would give nearly instantaneous control subject to the inherent bandwidth limitations of the circuits, and equally rapid loss of control. When combined with the integrative action, above analyzed, under suitable conditions it can be made to contribute to stable operation and more rapid control for the same open loop gain. Other means for obtaining the direct path component are possible besides the one shown in Fig. 11.

The integrating action described may be also considered as a means of predicting errors. This is useful when the sensing information suddenly stops or is reduced for any cause and later is resumed. In this case the double integrator predicts the necessary corrections based on a fixed rate of change of error, while the single integrator predicts fixed errors, and the combination of the two predicts both. Three integrators would predict acceleration or curvature of the manner in which the error is changing direction.

For a general aiding circuit the above integration may be used or not to any degree desired in conjunction with a direct path between buses 206 and 197, Fig. 9, for example, suitably decoupled, mixed, and attenuated, to give a combination of integrated and direct feedback control.

In using the above feedback circuitry care must be exercised in the connections and values of the various parameters in order to avoid unstability and oscillations in the feedback loop. The design criteria for stability requirements are given, for example, by H. W. Bode, in "Network Analysis and Feedback Amplifier Design," a book published by Van Nostrand, New York, 1945.

The feedback control circuit may be used to automatically adjust for changes of convergence of the beams when deviations occur as a result of the action of the main deflection system. It is preferred to reduce these changes of convergence as much as possible by keeping the beam axes close together as pointed out above. When such precautions still leave some convergence variations, and for the cases when such construction is not present, it is possible to use the system illustrated in Fig. 12. The portions of the circuit shown in Fig. 12 which are devoted to correcting the vertical alignment of the beam spots are substantially similar to those illustrated in Fig. 1.

Figure 8:
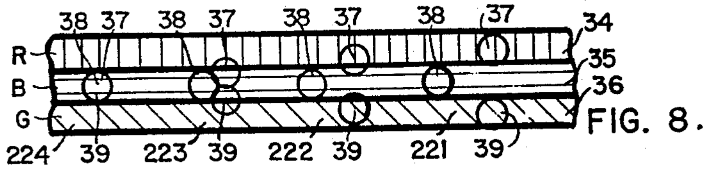
Fig. 8 illustrates a portion of the phosphor screen with the beam spots in various stages of convergence.

The type of deviations of convergence which the system illustrated in Fig. 12 is designed to correct are illustrated in Fig. 8. In the latter, correct alignment, both regarding to convergence and vertical positions is shown to the extreme right group of circles representing beam spots 37, 38, and 39, in group generally represented by cluster 221. As far as vertical alignment is concerned the members of cluster 222 are correctly spaced, with the blue signal modulated beam fully on the blue strip 35, while the red signal modulated beam 37 is partly into the blue strip, and the green signal modulated beam 39 is also partly into the blue. Since beam spots 37 and 39 are excited by the pilot frequency of opposite phase, their combined effect is to cancel out the pilot frequency, so that in the position shown such as cluster 222, Fig. 8, no vertical correcting voltage is produced or necessary. However, it is still mis-registration and is due to improper convergence. If the circle of convergence, defined by the center of the three beam spots, is increased in diameter, the configuration such as cluster 221, or that shown in Fig. 7, would produce perfect registration.

By applying the proper voltage to convergence electrode such as 127, illustrated in Figures 4, 5, and 12, the correct convergence can be obtained. This voltage may be different for differences of deflection as the beam spots are moved to different portions of the screen.

While I have shown the convergence control being exercised as a change of voltage on electrode 127, this is only one of many forms of such possible control. Another form can be the use of three separate electron guns, one for each beam. Each could have an electromagnet to deflect the beams. The three electromagnets would be connected to the same source of current. By properly orienting and phasing the electromagnets, the three beams can be made to change in convergence by changing the current passing through them. Still another form would be to have three separate electrostatic deflectors, one for each electron beam, and connecting them to a common voltage source. By varying the latter changes of convergence can be obtained.

Another condition, representing greater convergence error than 222, is illustrated as 223, Fig. 8. A still further error is illustrated by 224 where all the beam spots coincide or actually cross. In going from cluster 221 to 224 the crossing of the three beams can be considered as being in either the position nearer to the cathode from the screen, or the virtual position outside of the interior of the tube, beyond the screen face nearer to the observer. If the crossing of the three beams to produce group 221 is nearer to the viewer side of the screen, then as the convergence angle is increased clusters such as 222. 223, and 224 will be produced. For 224 convergence crossing is actually on the screen. As the angle increases further, clusters such as 223, 222, and 221 will be produced, in reverse order, with the crossing of the three beams on the side of the screen nearer to the gun. Either form of crossing of the three beams to produce cluster 221, or that illustrated in Fig. 7, would be adequate. Assume that the crossing is on the side of the screen nearer to the viewer, then the sense in which the gun is shown in relation to the phosphor screen color emitting strips is as illustrated in the drawings. The opposite order could also have been shown and would come within the scope of this invention. Then connections such as 29 and 30 would be reversed and the order of the phosphor strips from top to bottom would be GBR, and so on. Under the conditions assumed and illustrated, but if crossing of the three beams is incorrectly on the inside of the tube this will reverse the positions of the red and green modulating beam spots and the sense for correcting vertical misalignment will be reversed. However, if the blue beam spot is on the blue light emitting phosphor strip, the vertical correcting error voltages will not be produced but the position is vertically unstable.

If lowering the positive voltage that is applied to the convergence electrode 127 is such that the angle of convergence is made to decrease, and if the crossing of the beams is on the inside of the tube and the convergence is initially such that the beams are registered as in 221 but with red and green beams reversed, then the beam clusters will change in the first order 221, 222, 223, 224, with red and green beams reversed. Further lowering of the voltage will cause the beam clusters to change in the second order 224, 223, 222, and 221. The last cluster in the second order is perfect registration. The range in which convergence control by feedback is preferred, in accordance with this invention, is through both first and second orders.

In the second order the red and green beams are properly phased. The convergence control circuit is preferably slow acting and functions whenever blue light is emitted with pilot carrier frequency on it. The convergence of the beams is biased initially to cause more convergence than needed such as in cluster 223 in the second order or even more convergence such as 221 in either order. Still further bias can be set to cause convergence in any of the positions of the first order but not more than to preferably place the beams in a cluster short of 221, first order, which is maximnum allowable convergence. A possible maximum position for convergence is for the beams to assume a position between clusters 222 and 221, first order. This permits convergence correction to always get started. Position 221, first order, is one of unstable equilibrium for the vertical servo and any small change from it, with beam convergence momentarily fixed, will cause a rapid movement away from it. A position of stable equilibrium for first order is where the center of the green beam strikes the line between blue and green light emitting phosphor, and where the center of the red beam strikes the line between the red and blue emitting phosphor. In the first order this would be stable and hold in this position by vertical feedback because any tendency to move away from it would set up forces to restore it. Fortunately, this is also a position when the pilot frequency is always present; therefore, the convergence servo will cause the beam spots to approach together and go into the second order where the beams are correctly phased and properly oriented for true registration.

When the bias is set on the convergence electrode and convergence feedback is disconnected, the range of errors of convergence for the entire picture area should preferably not exceed the range from the convergence represented by a circle of slightly smaller diameter than that of cluster 221, first order, Fig. 8, to a circle also of slighly smaller diameter than that of cluster 221, second order. When convergence feedback is then connected the circuit will correct for these convergence errors and bring the convergence substantially to the situation shown as cluster 221, second order, Fig. 8. Whenever the convergence servo senses blue pilot frequency modulated light it will act to decrease convergence. This will cause the beam positions to assume a smaller circle of convergence if the order corresponds to the first and the red and green beams are reversed. Since blut pilot frequency modulated light continues to be emitted, steadily or intermittently, depending on the manner in which the beam spots are crossing the phosphor strips, the convergence is made smaller by the sensed information and the beams enter the second order where the circle of convergence gets larger. In this second order, the vertical servo, which is preferably fast acting, is properly phased.

The convergence servo continues to enlarge the diameter of the circle of convergence until clusters such as 221, Fig. 8, second order, or the cluster illustrated in Fig. 7 is attained. Then there is no blue light emitted to cause further increases in the diameter of the circle of convergence, and the position will be maintained with substantially perfect convergence. Feedback voltage causes a decrease of the angle of convergence, while the bias voltage on the convergence electrode causes an increase. This gives the two directions necessary to operate the system.

Because of the non-linearity between the video signal voltages into the control electrodes of the picture tube versus either the beam current or light emitted, there will be a tendency for the pilot frequency to become cross modulated by the video. When the beams are in proper convergence this effect will not disturb the vertical feedback control circuit because the red and green beams are never in the blue light emitting phosphor strip at the same time. That means the sense for the direction of control is not changed and cross modulation will have the effect of changing K2 and hence the open loop gain KA, which is high to start with. Cross modulation should preferably never cut off the beam. For convergence control the red and green beams may occupy the blue light emitting strip simultaneously. The convergence servo itself receives a undirectional vector from the screen sensing, while the other direction is a voltage bias. Cross modulation will not affect the unidirectional character of the vector from screen sensing, so that convergence by itself will not be affected except for changes of open loop gain, which if high will not deteriorate performance. When convergence is incorrect the vertical servo will be affected by unequal cross modulations on the red and green beams. As long as the pilot carrier it not cut off approximate vertical control will still take place, and the convergence servo acts to adjust to proper convergence, then the vertical control will cause exact registration to take place independently of cross modulation. Proper operation even with cross modulation is improved by the use of the aiding and integrating circuits.

Figure 6:
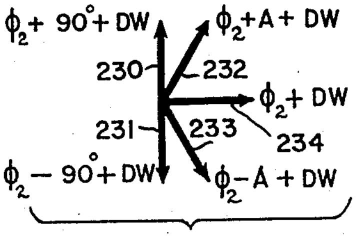
Fig. 6 is a vector diagram of the various phases of the pilot frequency signal in accordance with one embodiment of the invention.

In Fig. 6 a vector diagram is illustrated applicable to the combined vertical and convergence feedback control system, in accordance with this invention. This system is diagrammed in Fig. 12. In the latter figure 27 is the pilot oscillator which produces a frequency at initial reference phase $\phi_2$ on bus 250. This is applied to phase shifter 235 to shift the phase by A degrees such that the result is $\phi_2+A$ on bus 237. Likewise, the pilot frequency at phase $\phi_2$ is applied to phase shifter 236 to shift the phase by $-A$ degrees producing $\phi_2-A$ phase of the pilot frequency on bus 238. Bus 237 is applied to mixer 240 which mixes the $\phi_2+A$ phased frequency with the green video modulation on bus 242 from receiver 20. The output of 240 is applied to bus 244 which is connected to the green modulation beam control electrode of tube 247. Similarly, bus 238 is applied to mixer 241 which mixes the $\phi_2$—A phase frequency with the red video modulation on bus 243 from receiver 20. The output of 241 is applied to bus 245 which is connected to the red modulation beam control electrode of tube 247. Phase increments A and —A can be 60° and —60°, for example, making the difference of phases of the pilot frequency on the red and green beams 120°. The blue video signal on bus 246 is shown connected without mixing to the blue video modulation control electrode of the picture tube.

While I have shown the red and green signal electrodes of the picture tube as the ones which have impressed on them the pilot frequency at two different phases, this is only by way of example. Any two of the three electrodes can be used for the purpose. This is particularly true for the adaptation of screen energy emission and sensing means illustrated in Fig. 3, which is directly applicable to Fig. 12. For the adaptation using light emission with photo-tube pick up, the choice of connecting the red and green beams for modulation is preferred although not strictly necessary. While I have shown the oscillator 27 in Figures 1, 11, and 12 and 79 in Fig. 2, as being local oscillators, it is to be understood that this is only one form of use. It is possible also to derive the oscillator frequency from the receiver 20 by generating harmonics of frequencies already present or by taking them directly or by beat frequency techniques and other means in a known and standard manner.

For mixers 240 and 241 of Fig. 12 it is possible to use tube mixers with multiple control grids such that one input connects to one grid and the other input is connected to the other grid. A mixer such as is illustrated in Fig. 2 can also be used. In this latter case windings 81 and 82 would be adjusted by their respective capacitors 91 and 92 to not only act as mixers of the video signals and pilot frequency, but also act as phase shifters. The phase shifting can be done by adjusting the capacitors 91 and 92 such that, for example, 120° difference of phase of the pilot carrier is obtained. In other words, units 235 and 240 can be combined in coil 81 and capacitor 91, while units 236 and 241 can be combined in coil 82 and capacitor 92. Phase shifters 235 and 236 can also consist of one or more RC networks used with transformers or tubes in arrangements well known to those skilled in the art.

The operation of the vertical control feedback circuit, illustrated in Fig. 12, is similar to the operation already described for Fig. 1. The sensed energy fed into and amplified by pilot frequency amplifier 43 is applied to bus 251 which, in turn, is applied to the phase detector 252. The latter is one form of synchronous demodulator and is supplied with the reference phase $\phi_2$ shifted by 90° plus an amount of phase angle equal to the delay time D of the signal through the tube sensing circuitry, and pilot frequency amplifier, multiplied by W or $2\pi f$. That is, the reference frequency into the phase detector has phase $\phi_2+90°+DW$. This is illustrated in Fig. 6 by vector 230. Vector 231 has phase $\phi_2-90°+DW$ which is 180° from 230. The directions of these two vectors are those which establish the up-or-down correction in the vertical servo.

It is to be noted that bus 251 has the frequency at phase $\phi_2+A+DW$ of vector 232 or phase $\phi_2-A+DW$ of vector 233, Fig. 6, depending upon the actual misregistration on the tube screen. With perfect convergence either 232 may be present or 233, with zero or varying modulus, but not both. Assume, for the present, that convergence is correct, then if a signal vector such as 232 is present on bus 251, the phase detector 252 will demodulate that component of 232 which is in the direction of vector 230, Fig. 6, while if a signal vector such as 233 is present on bus 251, the phase detector 252 will demodulate that component of 233 which is in the direction of vector 231. The phase detector 252 will not demodulate any component of the signal vectors on bus 251 which are in phase or 180° related to vectors such as 234 in quadrature with vectors 230 or 231. The original reference phase from oscillator 27 is applied to bus 250 from which it is fed to unit 254 which may consist of a delay line or RC network and which gives a phase shift equal to DW. The shifted frequency is applied to circuit point 255 from which it is fed to 90° phase shifter 253. The 90° phase shifter may consist of one or more RC networks used with or without transformers or tubes. Phase shifter 253, in turn applies its output to bus 256 from which it is applied to the phase detector 252.

One form of phase detector is illustrated as 45 in Fig. 11. The output of phase detector 252 is applied to bus 47. The latter feeds unit 257 which is a combination of units 48 and 50 of Fig. 1. The operations of the other units in Fig. 12 which are marked by similar numerals that are shown in Fig. 1 also operate in the same manner. These operations have already been given in detail hereinabove. The operation of bus 258 from reverse and buffer unit 66 is similar to the action of bus 67, Fig. 1, or circuit point 89, Fig. 2, for periodically turning the beams on, as already explained. In Fig. 12, bus 220 represents the horizontal and vertical drive leads into the deflection yoke 32. Deflection circuit 31, illustrated in Fig. 1, drives 220. Bus 64 is connected in the same manner as the same numbered bus in Fig. 1.

Focus circuitry has not been shown in the drawings in order to avoid excessive details, since these circuits are well known to the art. Either electrostatic or electromagnetic focusing may be employed. When the latter is used it is preferable to use the type which does not rotate the beams as they are focused. Otherwise, if dynamic focus control is used, the focus change will rotate the spots, illustrated as perfect in Fig. 7, so that the red and green beam spots would no longer be on a vertical line. Moreover, even without dynamic focusing, adjustments of focus are much easier to make when it does not rotate the beam spots, since then no other compensations are needed. Rotation free magnetic focusing is well known to the art and may be achieved by two consecutive focusing coils wound in a counter rotating manner.

While the beam spots are oriented preferably on the vertices of equilateral triangles, this arrangement goes with the gun structure illustrated in Figures 4 and 5. It is possible to use other arrangements in the spacing of the beam spots, including those illustrated in my issued patents, above cited.

Returning now to Fig. 12, the operation of the vertical feedback circuit has already been covered. The convergence circuit will now be explained as applied to Fig. 12. The signal output on bus 251, with vector representation shown in Fig. 6, is also applied to phase detector 260 which is one of many possible forms and can be of the same type as 252. The displaced reference frequency at phase $\phi_2+DW$ on circuit point 255 is also applied to the phase detector 260. The signal at bus 251 with vectors phased as either 232 or 233 or both have a component in the direction of vector 234 with phase $\phi_2+DW$, the same reference applied to the phase detector 260. In accordance with the synchronous demodulation action only the components of the signal at 251, which are in phase with the reference 234, will be actually demodulated and hence produce a signal on output bus 261. Signals in quadrature with vector 234, such as those in phase with vectors 230, or 231, will not produce any output on bus 261. Therefore, the output of the phase detector 260 will not contain any information which is used for vertical feedback control. The latter is picked up by phase detector 252 only. On the other hand, information useful for convergence control, in phase with vector 234, is picked up by phase detector 260 only. It can be noted in Fig. 8 that the need for convergence correction for clusters 224, 223, 222, is also a condition where blue light with the pilot frequency is also produced, or if the adaptation of Fig. 3 is used, the pilot frequency is delivered to the input of amplifier 107. But in clusters 224, 223, 222 vectors such as 232 and 233 of Fig. 6 are both produced simultaneously, and since the vertical components, vectors 230 and 231, are produced equal and opposite, they cancel out, which means that the vertical error is corrected by the vertical feedback circuit. The simultaneous appearance of vectors 232 and 233 however, will still produce vector 234 which is picked up by phase detector 260 and utilized for convergence control.

The output of phase detector 260 on bus 261 is preferably passed to low-pass filter 262 in order to make the convergence circuit slower acting than the vertical control circuit. The output of 262 on bus 263 is applied to the convergence amplifier 264. In turn, the output of 264 is applied to bus 265 to convergence electrode 127. There is a bias source of voltage 266 set for proper value which applies bias voltage to electrode 127 through resistor 267, without interfering with the signal voltages applied from amplifier 264 to electrode 127 via bus 265.

It is possible to use an integrator to substitute for or in addition to the low-pass filter 262. What has been said about integrators above for the vertical deflection control circuit applies also to the convergence control circuit, and one or more of these integrators can be used for the latter circuit if necessary to improve the operation.

While I have described above the principles of my invention in connection with specific apparatus, it is to be clearly understood that this description is made only by way of example and not as a limitation to the scope of my invention.

I claim:

1. In a color television system embodying a color picture tube having a luminescent screen including a multiplicity of areas capable of producing light of different component colors when excited by electron beam energy deflected in a manner to scan a raster at the screen, means for developing error signals in accordance with errors of registration of the electron beam energy while exciting the luminescent screen, means for integrating the said error signals, and means including the integrated error signals to deflect the electron beam energy to correct the errors in registration.

2. In a color television system embodying a color picture tube having a luminescent screen including a multiplicity of areas capable of producing light of different component colors when excited by electron beam energy deflected in a manner to scan a raster at the screen, means for developing error signals in accordance with errors of registration of the electron beam energy while exciting the luminescent screen, means for integrating the said error signals, and means including the developed error signals and the integrated error signals to deflect the electron beam energy to correct errors in registration.

3. In a color television system embodying a color picture tube having a luminescent screen area with a multiplicity of substantially horizontal strips respectively capable of producing light of different component colors when excited by electron beam energy deflected in a manner to scan a raster on the said screen with horizontal and vertical deflection motion, means for developing error signals in accordance with the errors of registration of the electron beam energy while exciting the luminescent screen area, means for utilizing any error signal developed at substantially any time during the horizontal scan to rapidly alter the deflection of the electron beam energy to correct for errors of registration, and means for substantially holding such correction for the duration of the horizontal scan in which such developed error signal occurred after the developed error signal disappears.

4. In a color television system embodying a color picture tube having a luminescent screen area with a multiplicity of substantially horizontal strips respectively capable of producing light of different component colors when excited by electron beam energy deflected in a manner to scan a raster on the said screen with horizontal and vertical deflection motion, means for developing error signals in accordance with the errors of registration of the electron beam energy while exciting the luminescent screen area, means for utilizing any error signal which is changing in value and developed at substantially any time during the horizontal scan to rapidly change the deflection of the electron beam energy giving a rate of correction of registration error, and means to substantially maintain the rate of correction for the duration of the horizontal scan in which such changing error signal occurred after the developed changing error signal disappears.

5. In a color television system embodying a color picture tube having a luminescent screen with a multiplicity of areas respectively capable of producing light of different component colors when excited by electron beam energy deflected in a manner to scan a raster on the said screen with horizontal and vertical deflection motion, means for developing error signals in accordance with the errors of registration of the electron beam energy while exciting the luminescent screen, means for establishing a direct path for the signal, means for utilizing a multiplicity of integrators to integrate the said error signals to develop signal memory of position, rates, and higher order rates of the said error signals, and means including the developed signal memory and the direct path to deflect the electron beam energy to correct the errors of registration.

6. In a color television system embodying a color picture tube having a luminescent screen area with a multiplicity of substantially horizontal strips respectively capable of producing light of different component colors when excited by electron beam energy deflected in a manner to scan a raster on the said screen with horizontal and vertical deflection motion, means for developing error signals in accordance with the errors of registration of the electron beam energy while exciting the luminescent screen area, means for accumulating and holding all of the error signals in a storage circuit during substantially the entire time that the horizontal scanning operation is in progress, and means including the stored and held signals to alter the deflection motion of the electron beam energy to correct errors of registration.

7. In a color television system embodying a color picture tube having a luminescent screen area with a multiplicity of substantially horizontal strips respectively capable of producing light of different component colors when excited by electron beam energy deflected in a manner to scan a raster on the said screen with horizontal and vertical deflection motion, means for developing error signals in accordance with the errors of registration of the electron beam energy while exciting the luminescent screen area, storage means for accumulating and holding the error signals developed substantially during the entire time that the horizontal scanning operation is in progress, means for altering the value of the accumulated and held error signals at the end of any horizontal scan to the value held at the beginning of the same scan, and means including the altered accumulated and held error signals to modify the deflection motion of the electron beam energy to correct errors of registration.

8. In a television system embodying a color picture tube having a luminescent screen area with a multiplicity of substantially horizontal strips respectively capable of producing light of different component colors when excited by electron beam energy deflected in a manner to scan a raster on the said screen with horizontal and vertical deflection motion, means which include the screen to emit error signal energy in accordance with the errors of registration of the said electron beam energy while exciting the screen area, means for detecting the emitted error signal energy and converting it into electrical error signals, means for separating and holding the registration electrical error signals substantially at the start of any horizontal line, means for accumulating all of the electrical error signals in a storage circuit during substantially the entire time that the horizontal scanning operation is in progress up to the end of the horizontal scan, means for changing the accumulated and stored electrical error signals at the end of the scan of the horizontal line to the value of the separated and held signals at the start of the horizontal line, and means responsive to the electrical error signals and the signals held in the storage circuit to alter the deflection motion of the electron beam energy to correct errors of registration.

9. In a color television system embodying a color picture tube having a luminescent screen area with a multiplicity of substantially horizontal strips respectively capable of producing light of different component colors when excited by electron beam energy deflected in a manner to scan a raster on the said screen with horizontal and vertical deflection motion, means which include the screen area to emit error signal energy in accordance with the errors of registration of the said electron beam energy while exciting the screen area, means for detecting the emitted error signal energy and converting it into electrical error signals, means for separating and holding the registration electrical error signals at the start of any horizontal line, means for developing an error signal while the horizontal scan of the line progresses up to the end of the horizontal scan, means for changing the error signal at the end of the scan of the horizontal line to the value of the separated and held registration error signal at the start of the scan, and means responsive to the developed error signals while horizontal scan progresses and to the changed error signal to produce modified deflection motion of the electron beam energy to correct errors of registration.

10. In a color television system embodying a color picture tube having a luminescent screen area with a multiplicity of substantially horizontal strips respectively capable of producing light of different component colors when excited by electron beam energy deflected in a manner to scan a raster on said screen with horizontal and vertical deflection motion, means which include the screen area to emit error signal energy in accordance with the errors of registration of the electron beam energy while exciting the screen area, means for detecting said emitted error signal energy, means for converting the said detected error signal energy into electrical error signals, means for applying the electrical error signals to a mixing circuit, means for sampling the electrical error signals substantially at the start of each horizontal scan, means for storing the sampled electrical signals in a store, means responsive to the electrical error signals in the mixing circuit for changing the deflection motion of the electron beam energy in accordance with the error signals received at all times while horizontal scan progresses, means for sampling the said store and applying the result of the sampling to the mixing circuit before the start of the sampling of the electrical error signals modifying the electrical error signal, thereby altering deflection motion of the electron beam energy to correct errors of registration.

11. In a color television system as claimed in claim 10 wherein said means for applying electrical error signals to the mixing circuit includes integrating means to integrate the error signals before applying them to the mixing circuit.

12. In a color television system as claimed in claim 10 wherein said electron beam energy comprises a multiplicity of beams respectively modulated by signals of the component colors.

13. In a color television system as claimed in claim 10 wherein said means utilizing the screen to emit error signal energy include a mixture of blue light emitting phosphor to emit light of rapid decay characteristic, and the means for detecting said signal energy includes a light sensitive device responsive to the rapid decay emitted light.

14. In a color television system as claimed in claim 10 wherein said means utilizing the screen to emit error signal energy include secondary electron emitting areas aligned over the horizontal areas which produce light of one of the component colors, and the means for detecting said signal energy includes a collector adjacent to the screen to collect the signals from the secondary emitting areas when they are struck by the electron beam energy.

15. In a color television system wherein a plurality of electron beams are directed at a luminescent screen having an area with a multiplicity of substantially horizontal strips respectively capable of producing light of different component colors when excited by the electron beams deflected in a manner to scan a raster on the said screen with horizontal and vertical deflection motion, a pilot signal source of specified frequency, means for applying the pilot signal as superimposed modulation at a first phase on one of the said plurality of electron beams, means for applying the same pilot signal at the same frequency as superimposed modulation at a second phase different from the first by substantially 180° on another of the electron beams, means for generating phased error signals when the said modulated beams strike screen strips different from the strips intended for them signifying errors of registration, and means including a signal of constant phase from the pilot signal source responsive to the error signals to alter the deflection motion of the electron beams to correct errors of registration.

16. In a color television system wherein a plurality of electron beams are directed at a luminescent screen having an area with a multiplicity of substantially horizontal strips respectively capable of producing light of different component colors when excited by electron beams deflected in a manner to scan a raster on the said screen with horizontal and vertical deflection motion, a pilot signal source of specified frequency, means for applying the pilot signal as superimposed modulation at a first phase on one of the said plurality of electron beams, means for applying the same pilot signal at the same frequency as superimposed modulation at a second phase on another of the electron beams, means for generating phased error signals when the said modulated beams strike screen strips different from the strips intended for them signifying errors of registration whereby the phase of the error signals is in accordance with the direction of the errors, a phase comparator with means including a signal of constant phase responsive to the pilot signal source to convert the said phased error signals to phase demodulated signals whose polarity is in accordance with the direction of the error, and means utilizing the phase demodulated signals to superimpose deflection motion on the electron beams to correct errors of registration.

17. In a color television system according to claim 16 wherein said first and second phases differ substantially by 180°.

18. In a color television system wherein a plurality of electron beams are directed at a luminescent screen having an area with a multiplicity of substantially horizontal strips respectively capable of producing light of different component colors when excited by the electron beams deflected in a manner to scan a raster on the said screen with horizontal and vertical deflection motion, a pilot signal source of specified frequency, means for applying the pilot signal as superimposed modulation at a first phase on one of the said plurality of electron beams, means for applying the same pilot signal as superimposed modulation at a second phase on another of the electron beams, means for generating phased error signals when the said modulated beams strike screen strips different from the strips intended for them signifying errors of registration, means for integrating the said error signals, and means including the integrated signals to alter the deflection of the electron beams to correct errors of registration.

19. In a color television system wherein a plurality of electron beams are directed at a luminescent screen having an area with a multiplicity of substantially horizontal strips respectively capable of producing light of different component colors when excited by the electron beams deflected in a manner to scan a raster on the said screen with horizontal and vertical deflection motion, a pilot signal source of specified frequency, means for applying the pilot signal as superimposed modulation at a first phase on one of the said plurality of electron beams, means for applying the same pilot signal as superimposed modulation at a second phase on another of the electron beams, means for generating phased error signals when the said modulated beams strike screen strips different from the strips intended for them signifying errors of registration, means for utilizing any error signal developed at substantially any time during the horizontal scan to rapidly alter the deflection of the electron beams to correct for errors of registration, and means for substantially holding such correction for the duration of the horizontal scan in which such developed error signal occurred after the developed error signal disappears.

20. In a color television system wherein a plurality of electron beams are directed at a luminescent screen having an area with a multiplicity of substantially horizontal strips respectively capable of producing light of different component colors when excited by the electron beams deflected in a manner to scan a raster on the said screen with horizontal and vertical deflection motion, a pilot signal source of specified frequency, means for applying the pilot signal as superimposed modulation at a first phase on one of the said plurality of electron beams, means for applying the same pilot signal as superimposed modulation at a second phase on another of the electron beams, means for generating phased error signals when the said modulated beams strike screen strips different from the strips intended for them signifying errors of registration, means for utilizing any error signal which is changing in value and developed at substantially any time during the horizontal scan to rapidly change the deflection of the electron beams giving a rate of correction of registration error, and means to substantially maintain the rate of correction for the duration of the horizontal scan in which such changing error signal occurred after the developed changing error signal disappears.

21. In a color television system wherein a plurality of electron beams are directed at a luminescent screen having an area with a multiplicity of substantially horizontal strips respectively capable of producing light of different component colors when excited by the electron beams deflected in a manner to scan a raster on the said screen with horizontal and vertical deflection motion, a pilot signal source of specified frequency, means for applying the pilot signal as superimposed modulation at a first phase on one of the said plurality of electron beams, means for applying the same pilot signal as superimposed modulation at a second phase on another of the electron beams, means for generating phased error signals when the said modulated beams strike screen strips different from the strips intended for them signifying errors of registration, means for accumulating and holding all of the error signals in a storage circuit during substantially the entire time that the horizontal scanning operation is in progress, and means including the stored and held signals to alter the deflection motion of the electron beams to correct errors of registration.

22. In a color television system wherein a plurality of electron beams are directed at a luminescent screen having an area with a multiplicity of substantially horizontal strips respectively capable of producing light of different component colors when excited by the electron beams in a manner to scan a raster on the said screen with horizontal and vertical deflection motion, a pilot signal source of specified frequency, means for applying the pilot signal as superimposed modulation at a first phase on one of the said plurality of electron beams, means for applying the same pilot signal as superimposed modulation at a second phase on another of the electron beams, means for generating phased error signals when the said modulated beams strike screen strips different from the strips intended for them signifying errors of registration whereby the phase of the error signals is in accordance with the direction of the error, a phase detector with means responsive to the pilot signal source to convert the said phased error signals to phase demodulated error signals whose polarity is in accordance with the direction of the error, means for separating and holding the demodulated error signals substantially at the start of any horizontal line, means for accumulating all of the demodulated error signals in a storage circuit during substantially the entire time that the horizontal scanning operation is in progress up to the end of any horizontal scan, means for changing the accumulated and stored error signals at the end of the scan of any horizontal line to the value of the separated and held error signals at the start of the horizontal line, and means including the signals held in the storage circuit to alter the deflection motion of the electron beams to correct errors of registration.

23. In a color television system wherein a plurality of electron beams are directed at a luminescent screen having an area with a multiplicity of substantially horizontal strips respectively capable of producing light of different component colors when excited by electron beams deflected in a manner to scan a raster on the said screen with horizontal and vertical deflection motion, a pilot signal source of specified frequency, means for applying the pilot signal as superimposed modulation at a first phase on one of the said plurality of electron beams, means for applying the same pilot signal as superimposed modulation at a second phase on another of the electron beams, means for generating phased error signals when the said modulated beams strike screen strips different from the strips intended for them signifying errors of registration whereby the phase of the error signals is in accordance with the direction of the error, a phase detector with means responsive to the pilot signal source to convert the said phased error signals to phase demodulated error signals whose polarity is in accordance with the direction of the error, means for separating and holding the error signals substantially at the start of any horizontal line, means for developing an error signal while the horizontal scan of the line progresses up to the end of the horizontal line, means for changing the error at the end of the scan of the horizontal line to the value of the separated and held error signals at the start of the scan, and means responsive to the developed and changed error signals to superimpose deflection motion on the electron beams to correct errors of registration.

24. The combination according to claim 23 wherein the said means for separating and holding the error signals substantially at the start of any horizontal line includes means for simultaneously turning on said plurality of electron beams.

25. In a color television system wherein a plurality of electron beams are directed at a luminescent screen having an area with a multiplicity of substantially horizontal strips respectively capable of producing light of different component colors when excited by the electron beams in a manner to scan a raster on the said screen with horizontal and vertical deflection motion, a pilot signal source of specified frequency, means for applying the pilot signal as superimposed modulation at a first phase on one of the said plurality of electron beams, means for applying the same pilot signal as superimposed modulation at a second phase on another of the electron beams, means for generating phased error signals when the said modulated beams strike screen strips different from the strips intended for them signifying errors of registration whereby the phase of the error signals is in accordance with the direction of the error, a phase detector with means responsive to the pilot signal source to convert the said phased error signals to phase demodulated error signals whose polarity is in accordance with the direction of the error, means for applying the demodulated error signals to a mixing circuit, means for sampling the demodulated error signals substantially at the start of each horizontal scan, means for storing the sampled error signals in a store, means responsive to the error signals in the mixing circuit for changing the motion of the electron beams in accordance with the error signals generated substantially at all times while horizontal scan progresses, means for sampling the said store and applying the result of the sampling to the mixing circuit before the start of the sampling of the demodulated error signals modifying the error signals, thereby altering the deflection motion of the electron beams to correct errors of registration.

26. In a color television system wherein three electron beams are directed at a luminescent screen consisting of three sets of a multiplicity of substantially horizontal strips with one set producing red light the other set producing blue light and the remaining set producing green light when excited by the electron beams deflected in a manner to scan a raster on the said screen with horizontal and vertical deflection motion, a pilot signal source of specified frequency, means for applying the pilot signal as superimposed modulation at a first phase on the electron beam intended to excite the red light producing strips of the screen, means for applying the same pilot signal at the same frequency as superimposed modulation at a second phase differing from the first by substantially 180° on the electron beam intended to excite the green light producing strips of the screen, means on the blue light producing strips of the screen adapting them to emit fast decay light of a color which differs from both red and green, means for producing fast decay light with the pilot signal modulations at substantially the first phase when the beam intended to strike the red light producing strips strikes the blue strips, means for producing fast decay light with the pilot signal modulations at substantially the second phase when the beam intended to strike the green light strips strikes blue strips, a light sensitive device with means adapting it to respond to the fast decay light and produce error signals of a phase in accordance with that of the light, a phase detector with means including a signal of constant phase from the pilot signal source to demodulate the error signals from the light sensitive device producing error voltages whose polarity is in accordance with the sense of the phase, and means responsive to the error voltages to alter the vertical deflection of the electron beams to correct errors of registration.

27. In a color television system as claimed in claim 26 wherein the means on the blue light producing strips include a phosphor which produces fast decay light of substantially violet color mixed with blue phosphor of slower decay.

28. In a color television system wherein three electron beams are directed at a luminescent screen consisting of three sets of a multiplicity of substantially horizontally oriented strips respectively capable of producing light of different component colors when excited by the electron beams in a manner to scan a raster on the said screen with horizontal and vertical deflection motion, a pilot signal source of specified frequency, means for applying the pilot signal as superimposed modulation at a first phase on one of the said three electron beams, means for applying the same pilot signal at the same frequency as superimposed modulation at a second phase on another of said three electron beams, means on the luminescent screen including a set of secondary electron emission strips whose emission differs from that of the surrounding material aligned over the horizontal light producing strips of the screen which are intended to be excited by the electron beam which has no pilot frequency modulation adapting the strips to produce secondary emission electrons when struck by the electron beams, means for producing secondary emission electrons with pilot frequency modulations at substantially the first or second phases respectively when the electron beams modulated by the pilot frequencies at the respective phases strikes the secondary electron emission strips, a collector electrode with means adapting it to produce phased electrical error signals in accordance with the phase of the secondary emitted electrons, a phase detector with means to demodulate the electrical error signals from the collector electrode producing error voltages of a polarity in accordance with the sense of the phase, and means responsive to the error voltages to alter the vertical deflection of the electron beams to correct errors of registration.

29. In a color television system, three electron beams with means adapting them to be directed at a luminescent screen consisting of three sets of a multiplicity of substantially horizontal strips respectively capable of producing light of different component colors when excited by the electron beams in a manner to scan a raster on the said screen with horizontal and vertical deflection motion, a common cathode having a flat surface adapted to emit electrons, three signal control electrodes having coplanar surfaces parallel with that of the cathode and positioned adjacent thereto, three holes located respectively on each of the control electrodes and adapted to allow passage of the electron beams and positioned substantially 120° apart, a beam shield and convergence electrode with a surface parallel to that of the control electrodes and positioned adjacent to the control electrodes and having holes to match those on the control electrodes and adapted to pass the electron beams, means for producing color television signals corresponding to the three component colors on three buses, means for connecting the buses respectively to the control electrodes to modulate the electron beams, a source of voltage connected to the beam shield and convergence electrode, a pilot signal source of specified frequency, means for applying the pilot signal as superimposed modulation at a first phase on one of the said control electrodes, means for applying the same pilot signal at the same frequency as superimposed modulation at a second phase on another of the control electrodes, means for generating phased error signals when the said modulated beams strike screen strips different from the strips intended for them signifying errors of registration, and means responsive to the error signals to alter the deflection motion of the electron beams to correct errors of registration.

30. A color television system comprising in combination, a plurality of adjacently positioned substantially horizontal strips capable of producing light of different selected component colors, means for producing an electron beam for each of the selected component colors, means for deflecting the electron beams substantially along the light producing strips in horizontal and vertical deflection motion to produce light of different component colors, means for changing the convergence of the said electron beams for controlling the position of the scanning beams with respect to each other, a pilot signal source of specified frequency, means for applying the pilot frequency signal as superimposed modulation at a first phase on one of the said electron beams, means for applying the same pilot signal at the same frequency as superimposed modulation at a second phase which differs from the first phase by an angular measure different from 180° on another of the electron beams, means for producing deflection and convergence phase error signals which differ respectively in phase when the electron beams strike the strips which differ from the ones which they are intended to strike, and means responsive to the different phase error signals to alter the deflection motion and the convergence of the electron beams to correct errors of registration.

31. A color television system comprising in combination, a plurality of adjacently positioned substantially horizontal strips capable of producing light of different selected component colors, means for producing an electron beam for each of the selected component colors, means for deflecting the electron beams substantially along the light producing strips in horizontal and vertical deflection motion to produce light of the different component colors, means for changing the convergence of the said electron beams for controlling the position of the scanning beams with respect to each other, a pilot signal source of specified frequency, means for applying the pilot signal as superimposed modulation at a first phase on one of the said electron beams, means for applying the same pilot signal at the same frequency as superimposed modulation at a second phase which differs from the first phase by an angular measure different from 180° on another of the electron beams, means for producing a deflection phase error signal when the said pilot signal modulated electron beams strike any horizontal strip different from the ones intended for them wherein one of the said modulated beams strikes incorrectly by an amount substantially different from the said other beam, means for producing a convergence phase error signal different from the said deflection phase error signal when the pilot signal modulated electron beams strike any horizontal strips different from the ones intended for them, means responsive to the deflection phase error signal to alter the deflection of the electron beams to correct the differences of striking error of the said pilot modulated beams, and means for applying the convergence phase error signal to the said means for changing the convergence of the beams to correct errors of convergence.

32. A color television system according to claim 31 wherein the means for producing the electron beam for each of the selected colors includes a common cathode having a flat surface adapted to emit electrons, three signal control electrodes adapted to receive modulating signals and having coplanar surfaces parallel with that of the cathode and positioned adjacent thereto, three holes located respectively on each of the control electrodes and adapted to allow passage of the electron beams and positioned substantially 120° apart, and the means for changing the convergence of the said electrons consists of a beam shield and convergence electrode with a surface parallel to that of the control electrodes and positioned adjacent to the control electrodes and having holes to match those on the control electrodes and adapted to pass the electron beams, and the means for applying the convergence phase error signals includes further means for applying voltage to the beam shield and convergence electrode in accordance with the convergence phase error signal.

33. A color television system according to claim 31 wherein the means for producing a deflection phase error signal includes a light sensitive device responsive to the light produced when the said pilot signal modulated beams strike strips which differ from the ones which are intended for them, and the means for producing a convergence phase error signal includes the same said light sensitive device.

34. A color television system according to claim 31 wherein the means for producing a deflection phase error signal includes substantially horizontal strips to produce secondary emission electrons to a different degree than the surrounding material aligned over the strips which differ from the ones which the said pilot signal modulated beams are intended to strike and a collector electrode with means adapting it to collect secondary emitted electrons from the said aligned strips, and the means for producing a convergence phase error signal includes the same aligned strips and collector electrode.

35. A color television system according to claim 31 wherein the means responsive to the deflection phase error signal includes a phase detector with means adapting it to derive reference phase from the pilot signal source, and the means for applying the convergence phase error includes another phase detector with means adapting it to derive reference phase from the same pilot signal source but of different reference phase than the first mentioned phase detector.

36. A color television system according to claim 31 wherein the means responsive to the deflection phase error signal includes a phase detector with means adapting it to derive a first reference phase from the pilot signal source and the said first reference phase is substantially in quadrature with the phase which is derived in the sum of the phase vectors applied to the two pilot frequency modulated beams after both are shifted by a phase proportional to the transit time for the signal to arrive at the said phase detector, and the means for applying the convergence phase error includes another phase detector with means adapting it to derive a second reference phase from the same pilot signal source but substantially in quadrature with the said first reference phase.

References Cited in the file of this patent

UNITED STATES PATENTS

| | | |
|---|---|---|
| 2,792,521 | Sziklai | May 14, 1957 |
| 2,831,052 | Boothroyd | Apr. 15, 1958 |